United States Patent
Simard et al.

(10) Patent No.: US 7,120,297 B2
(45) Date of Patent: Oct. 10, 2006

(54) SEGMENTED LAYERED IMAGE SYSTEM

(75) Inventors: Patrice Y. Simard, Bellevue, WA (US); Erin L. Renshaw, Kirkland, WA (US); James Russell Rinker, Kirkland, WA (US); Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 889 days.

(21) Appl. No.: 10/180,169

(22) Filed: Jun. 26, 2002

(65) Prior Publication Data

US 2003/0202697 A1    Oct. 30, 2003

Related U.S. Application Data

(63) Continuation-in-part of application No. 10/133,842, filed on Apr. 25, 2002, and a continuation-in-part of application No. 10/133,558, filed on Apr. 25, 2002, and a continuation-in-part of application No. 10/133,939, filed on Apr. 25, 2002.

(51) Int. Cl.
*G06K 9/00* (2006.01)
*G06K 9/36* (2006.01)

(52) U.S. Cl. .................... 382/166; 382/232; 382/243; 358/426.01

(58) Field of Classification Search ............... 382/162, 382/166, 232, 243; 358/426.01–426.16
See application file for complete search history.

(56) References Cited

U.S. PATENT DOCUMENTS

| | | | |
|---|---|---|---|
| 3,606,546 A | 9/1971 | Dudley et al. | |
| 3,719,922 A | 3/1973 | Lopes, Jr. et al. | |
| 3,882,454 A | 5/1975 | Marie et al. | |
| 4,606,069 A | 8/1986 | Johnson et al. | |
| 4,747,156 A | 5/1988 | Wahl | |
| 4,754,492 A | 6/1988 | Malvar | |
| 4,922,545 A | 5/1990 | Endoh et al. | |
| 4,924,494 A | 5/1990 | Shung | |
| 5,077,807 A | 12/1991 | Bokser | |
| 5,129,014 A | 7/1992 | Bloomberg | |
| 5,304,991 A | 4/1994 | Motegi | |

(Continued)

FOREIGN PATENT DOCUMENTS

EP    0 567 344 A2    10/1993

(Continued)

OTHER PUBLICATIONS

Debargha Mukherjee, et al.; "JPEG2000-Matched MRC Compression of Compound Documents"; Jun. 6, 2002.

(Continued)

*Primary Examiner*—Jingge Wu
*Assistant Examiner*—Aaron Carter
(74) *Attorney, Agent, or Firm*—Amin & Turocy, LLP

(57) ABSTRACT

Systems and methods for encoding and decoding document images are disclosed. Document images are segmented into multiple layers according to a mask. The multiple layers are non-binary. The respective layers can then be processed and compressed separately in order to achieve better compression of the document image overall. A mask is generated from a document image. The mask is generated so as to reduce an estimate of compression for the combined size of the mask and multiple layers of the document image. The mask is then employed to segment the document image into the multiple layers. The mask determines or allocates pixels of the document image into respective layers. The mask and the multiple layers are processed and encoded separately so as to improve compression of the document image overall and to improve the speed of so doing. The multiple layers are non-binary images and can, for example, comprise a foreground image and a background image.

65 Claims, 12 Drawing Sheets

U.S. PATENT DOCUMENTS

| | | | |
|---|---|---|---|
| 5,402,146 A | 3/1995 | Rodriguez et al. | |
| 5,434,953 A | 7/1995 | Bloomberg | |
| 5,454,047 A | 9/1995 | Chang et al. | |
| 5,572,565 A | 11/1996 | Abdel-Mottaleb | |
| 5,572,604 A | 11/1996 | Simard | |
| 5,610,996 A | 3/1997 | Eller | |
| 5,737,455 A | 4/1998 | Harrington et al. | |
| 5,754,183 A | 5/1998 | Berend et al. | |
| 5,778,092 A | 7/1998 | MacLeod et al. | |
| 5,790,696 A | 8/1998 | Takahashi | |
| 5,805,727 A | 9/1998 | Nakano | |
| 5,805,739 A | 9/1998 | Malvar et al. | |
| 5,828,771 A | 10/1998 | Bloomberg | |
| 5,910,805 A | 6/1999 | Hickey et al. | |
| 5,914,748 A | 6/1999 | Parulski et al. | |
| 5,915,044 A | 6/1999 | Gardos et al. | |
| 5,917,951 A | 6/1999 | Thompson et al. | |
| 5,917,964 A | 6/1999 | Normile | |
| 5,923,380 A | 7/1999 | Yang et al. | |
| 5,930,377 A | 7/1999 | Powell et al. | |
| 5,960,111 A * | 9/1999 | Chen et al. | 382/173 |
| 5,960,119 A | 9/1999 | Echigo et al. | |
| 5,991,515 A | 11/1999 | Fall et al. | |
| 6,000,124 A | 12/1999 | Saito et al. | |
| 6,029,126 A | 2/2000 | Malvar | |
| 6,058,362 A | 5/2000 | Malvar | |
| 6,064,762 A | 5/2000 | Haenel | |
| 6,069,636 A | 5/2000 | Sayuda et al. | |
| 6,072,496 A | 6/2000 | Guenter et al. | |
| 6,073,153 A | 6/2000 | Malvar | |
| 6,094,506 A | 7/2000 | Hullender | |
| 6,100,825 A | 8/2000 | Sedluk et al. | |
| 6,108,446 A | 8/2000 | Hoshen | |
| 6,115,689 A | 9/2000 | Malvar | |
| 6,118,890 A | 9/2000 | Senior | |
| 6,137,908 A | 10/2000 | Rhee | |
| 6,144,767 A | 11/2000 | Bottou et al. | |
| 6,151,424 A | 11/2000 | Hsu | |
| 6,154,762 A | 11/2000 | Malvar | |
| 6,182,034 B1 | 1/2001 | Malvar | |
| 6,192,360 B1 | 2/2001 | Dumais et al. | |
| 6,233,364 B1 | 5/2001 | Krainiouk et al. | |
| 6,240,380 B1 | 5/2001 | Malvar | |
| 6,253,165 B1 | 6/2001 | Malvar | |
| 6,256,608 B1 | 7/2001 | Malvar | |
| 6,272,253 B1 | 8/2001 | Bannon et al. | |
| 6,285,801 B1 | 9/2001 | Mancuso et al. | |
| 6,309,424 B1 | 10/2001 | Fallon | |
| 6,310,972 B1 | 10/2001 | Li et al. | |
| 6,321,243 B1 | 11/2001 | Ballard | |
| 6,324,560 B1 | 11/2001 | Malvar | |
| 6,326,977 B1 | 12/2001 | Westerman | |
| 6,334,001 B1 | 12/2001 | de Queiroz et al. | |
| 6,345,119 B1 | 2/2002 | Hotta et al. | |
| 6,564,263 B1 | 5/2003 | Bergman et al. | |
| 6,633,670 B1 * | 10/2003 | Matthews | 382/176 |
| 6,731,800 B1 * | 5/2004 | Barthel et al. | 382/176 |
| 6,738,079 B1 | 5/2004 | Kellerman et al. | |
| 6,819,796 B1 * | 11/2004 | Hong et al. | 382/173 |
| 6,826,727 B1 | 11/2004 | Mohr et al. | |
| 6,901,153 B1 * | 5/2005 | Leone | 382/107 |
| 6,907,141 B1 | 6/2005 | Okamoto | |
| 6,977,664 B1 * | 12/2005 | Jinzenji et al. | 345/629 |
| 2001/0004618 A1 | 6/2001 | Hur | |
| 2002/0064313 A1 * | 5/2002 | Cheng | 382/239 |
| 2003/0123729 A1 | 7/2003 | Mukherjee et al. | |
| 2003/0229856 A1 | 12/2003 | Lynn et al. | |

FOREIGN PATENT DOCUMENTS

| | | |
|---|---|---|
| EP | 0 621 554 A2 | 10/1994 |
| EP | 0802680 | 10/1997 |
| EP | 0853421 | 7/1998 |
| EP | 1006714 A2 | 6/2000 |
| EP | 1104916 | 6/2001 |
| EP | 1006714 A3 | 9/2001 |
| EP | 1146478 A2 | 10/2001 |
| GB | 2181875 | 4/1987 |
| GB | 2 230 633 A | 10/1990 |

OTHER PUBLICATIONS

Rangachar Kasturi, et al.; "Document Image Analysis: A Primer"; Sadhana vol. 27, Part 1, Feb. 2002, pp. 3-22.

Qian Huang et al.; "Foreground/Background Segmentation of Color Images by Integration of Multiple Cues"; Proceedings of '95 Int'l. Conf. on Image Processing (ICIP.

Guotong Feng, et al.; "High Quality MRC Document Coding"; School of Electrical and Computer Engineering; Purdue University; Sarnoff Corporation.

Ping Wah Wong; Halftoning by Multiscale Dot Distribution; Proceedings of the '95 Int'l. Conf. on Image Processing (ICIP '95); pp. 117-120.

Yann LeCun, et al.; "Learning Algorithms for Classification: A Comparison on Handwritten Digit Recognition"; AT&T Bell Laboratories.

Patrice Y. Simard, et al.; "Boxlets: A Fast Convolution Algorithm for Signal Processing and Neural Networks"; AT&T Labs-Research.

Trevor Hastie, et al.; "Metrics and Models for Handwritten Character Recognition"; Dec. 8, 1997; pp. 1-18.

Leon Bottou, et al.; "High Quality Document Image Compression with DjVu"; Jul. 13, 1998; AT&T Labs.

Patrick Haffner, et al.; "Color Documents on the Web with DjVu"; AT&T Labs—Research.

Yiu-fai Wong, et al.; Preprocessing of Video Signals for MPEG Coding by Clustering Filter; Proceedings of the '95 Int'l. Conf. on Image Processing (ICIP: '95); pp. 129-132.

Patrick Haffner, et al.; "DjVu: Analyzing and Compressing Scanned Documents for Internet Distribution"; AT&T Labs-Research; pp. 1-4.

Felix Balado Pumarino, et al.; "A Two-Stage Codebook Building Method Using Fast WAN"; University of Vigo, Communications Technology Department.

Henrique S. Malvar; "Fast Progressive Wavelet coding"; Microsoft Research.

Patrice Y. Simard, et al.; "A Wavelet Coder for Masked Images"; Proceedings of the Data Compression Conference (DCC'01); Microsoft Research.

U.S. Appl. No. 10/180,800, filed Jun. 26, 2002, Malvar et al.
U.S. Appl. No. 10/180,649, filed Jun. 26, 2002, Simard et al.
U.S. Appl. No. 10/133,939, filed Apr. 25, 2002, Simard et al.
U.S. Appl. No. 10/133,558, filed Apr. 25, 2002, Simard et al.
U.S. Appl. No. 10/180,771, filed Jun. 26, 2992, Simard et al.

Queiroz, et al. "Optimizing Block-Thresholding Segmentation for Multilayer Compression of Compound Images" (Sep. 9, 2000) IEEE Transactions on Image Processing, IEEE Inc. New York, pp. 1461-1471.

Salembier, et al. "Region-Based Representations of Image and Video: Segmentation Tools for Multimedia Services" (Dec. 8, 1999) IEEE Transactions on Circuits and Systems for Video Technology, IEEE Inc. New York, pp. 1147-1169.

Haffner, et al. "Browsing through high quality document images with DjVu" Research and Technology Advances in Digital Libraries. ADL 1998 Proceedings (Apr. 22, 1998) IEEE International Forum in Santa Barabra, California, pp. 309-318.

Simard, et al. "A Wavelet coder for Masked Images" Proceedings IEE Data Compression Conference (Mar. 27, 2001) Snowbird, Utah, pp. 93-102.

Simard, et al. "A Forefround/Background Separation Algorith for Image Compression" (Mar. 23, 2004) Data Compression Conference, Snowbird, Utah, pp. 498-507.

European Search Report dated Oct. 4, 2005 mailed Oct. 13, 2005 for EP Application Serial No. 03005430, 5 pages.

Mukherjee, et al. "LPEG-Matched MRC Compression of Compound Documents" Proceedings 2001 International Conference of Image Processing (Oct. 7-10, 2001) Thessalonki, Greece, pp. 434-437.

Cosman, et al. "Memory Efficient Quadtree Wavelet Coding for Compound Images" Conference Record of the Thirty-Third Asilomar Conference (Oct. 24-27, 1999) Piscataway, New Jersey, pp. 1173-1177.

European Search Report dated Oct. 4, 2005 mailed Oct. 13, 2005 for EP Application Serial No. 03/005,431, 5 pages.

European Search Report dated Oct. 4, 2005 mailed Oct. 13, 2005 for PCT Application Serial No. 10/180,169, 5 pages.

U.S. Appl. No. 10/133,842, filed Apr. 25, 2002, Simard et al.

U.S. Appl. No. 11/198,562, filed Aug. 5, 2005, Simard et al.

U.s. Appl. No. 11/286,622, filed Nov. 23, 2005, Malvar et al.

European Search Report dated Sep. 15, 2005, mailed Sep. 30, 2005, for European Patent Application Serial No. EP 03 00 5429, 4 Pages.

Witten, Ian H., et al; "Textual Image Compression", Data Compression Conference, IEEE, 10 pages, Mar. 24, 1992.

European Search Report dated Nov. 21, 2005, mailed Nov. 30, 2005, for European Patent Application Serial No. EP 03 00 6769, 3 Pages.

* cited by examiner

SEGMENTED LAYERED IMAGE SYSTEM

This application is a continuation-in-part of U.S. Utility Application Ser. No. 10/133,842 which was filed Apr. 25, 2002, entitled ACTIVITY DETECTOR, U.S. Utility Application Ser. No. 10/133,558 which was filed Apr. 25, 2002, entitled CLUSTERING, and of U.S. Utility Application Ser. No. 10/133,939 which was filed Apr. 25, 2002, entitled LAYOUT ANALYSTS. This application is also related to co-pending U.S. application Ser. No. 10/180,771 entitled SYSTEM AND METHOD FACILITATING DOCUMENT IMAGE COMPRESSION UTILIZING A MASK, the entirety of which is incorporated herein by reference. This application is also related to co-pending U.S. application Ser. No. 10/180,649 entitled BLOCK RETOUCHING, the entirety of which is incorporated herein by reference.

TECHNICAL FIELD

The present invention relates generally to document image processing, and more particularly to systems and methods for identifying and compressing document images.

BACKGROUND OF THE INVENTION

The amount of information available via computers has dramatically increased with the wide spread proliferation of computer networks, the Internet and digital storage means. With such an increased amount of information has come the need to transmit information quickly and to store the information efficiently. Data compression is a technology that facilitates effectively transmitting and storing of information Data compression reduces an amount of space necessary to represent information, and can be used for many information types. The demand for compression of digital information, including images, text, audio and video has been ever increasing. Typically, data compression is used with standard computer systems; however, other technologies make use of data compression, such as but not limited to digital and satellite television as well as cellular/digital phones.

As the demand for handling, transmitting and processing large amounts of information increases, the demand for compression of such data increases as well. Although storage device capacity has increased significantly, the demand for information has outpaced capacity advancements. For example, an uncompressed image can require 5 megabytes of space whereas the same image can be compressed and require, for example, only 2.5 megabytes of space for lossless compression or 500 kilobytes of space for lossy compression. Thus, data compression facilitates transferring larger amounts of information. Even with the increase of transmission rates, such as broadband, DSL, cable modem Internet and the like, transmission limits are easily reached with uncompressed information. For example, transmission of an uncompressed image over a DSL line can take ten minutes. However, the same image can be transmitted in about one minute when compressed thus providing a tenfold gain in data throughput.

In general, there are two types of compression, lossless and lossy. Lossless compression allows exact original data to be recovered after compression, while lossy compression allows for data recovered after compression to differ from the original data. A tradeoff exists between the two compression modes in that lossy compression provides for a better compression ratio than lossless compression because some degree of data integrity compromise is tolerated. Lossless compression may be used, for example, when compressing critical text, because failure to reconstruct exactly the data can dramatically affect quality and readability of the text. Lossy compression can be used with images or non-critical text where a certain amount of distortion or noise is either acceptable or imperceptible to human senses. Data compression is especially applicable to digital representations of documents (digital documents). Typically, digital documents include text, images and/or text and images. In addition to using less storage space for current digital data, compact storage without significant degradation of quality would encourage digitization of current hardcopies of documents making paperless offices more feasible. Striving toward such paperless offices is a goal for many businesses because paperless offices provide benefits, such as allowing easy access to information, reducing environmental costs, reducing storage costs and the like. Furthermore, decreasing file sizes of digital documents through compression permits more efficient use of Internet bandwidth, thus allowing for faster transmission of more information and a reduction of network congestion. Reducing required storage for information, movement toward efficient paperless offices, and increasing Internet bandwidth efficiency are just some of many significant benefits associated with compression technology.

Compression of digital documents should satisfy certain goals in order to make use of digital documents more attractive. First, the compression should enable compressing and decompressing large amounts of information in a small amount of time. Secondly, the compression should provide for accurately reproducing the digital document. Additionally, data compression of digital documents should make use of an intended purpose or ultimate use of a document. Some digital documents are employed for filing or providing hard copies. Other documents may be revised and/or edited. Many conventional data compression methodologies fail to handle re-flowing of text and/or images when viewed, and fail to provide efficient and effective means to enable compression technology to recognized characters and re-flow them to word processors, personal digital assistants (PDAs), cellular phones, and the like. Therefore, if hard copy office documents are scanned into digital form, current compression technology can make it difficult if not impossible to update, amend, or in general change the digitized document.

Often, compression schemes are tailored to a particular type of document, such as binary, non-binary, textual or image, in order to increase compression. However, a compression scheme tailored for one type of document does not typically perform well for other types of documents. For example, a compression scheme tailored for textual based documents does not generally perform well with an image document. One solution to this problem is to select a compression scheme tailored to the type of document or image to be encoded. However, this solution can fail for digital documents which have more than one type of information in a single document. For example, a digital document can have a hi-color image along with textual information, such as is commonly seen in magazine articles. One approach to overcome this failing is to analyze a document and divide it into various regions. The various regions can be analyzed to determine the type of information contained within the reasons. A compression scheme can be selected for each region based on the type of information. However, this approach can be quite difficult to implement and requires regions of a variety of sizes and shapes which cause difficulties for compression. Another approach is to separate a document into a background and a constant color image.

This can be helpful because a different compression scheme can be used for the background and the constant color image. However, the constant color image can cause information to be lost by forcing pixel values to be a constant color.

Additionally, data compression of digital documents should make use of the purpose of a document. Some digital documents are used for filing or providing hard copies. Other documents may be revised and/or edited. Current data compression fails to handle re-flowing of text and/or images when viewed, and fails to provide efficient and effective means to enable compression technology to recognized characters and re-flow them to word processors, personal digital assistants (PDAs), cellular phones, and the like. Therefore, if hard copy office documents are scanned into digital form, current compression technology can make it difficult if not impossible to update, amend, or in general change the digitized document.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention relates generally to systems and methods for encoding and decoding document images. Document images are segmented into multiple layers according to a mask, where the multiple layers are represented as non-binary. The respective layers can then be processed and compressed separately in order to facilitate better compression of the document image overall.

According to one aspect of the invention, a mask is generated from a document image. The mask is generated so as to reduce an estimate of compression for the combined size of the mask and multiple layers of the document image. The mask is then employed to segment the document image into the multiple layers. The mask determines or allocates pixels of the document image into respective layers. The mask and the multiple layers are processed and encoded separately so as to improve compression of the document image overall and to improve the speed of so doing. The multiple layers are non-binary images and can, for example, comprise a foreground image and a background image.

According to another aspect of the invention, a document image is segmented into multiple layers, the multiple layers comprising a foreground image, a background image and a mask. The mask is a binary image and used to segment the document image into the foreground image and the background image. Generally, the mask is generated so as to reduce an estimate of a combined size of the mask, the foreground image and the background image. Unlike some conventional systems that limit a layer to a single color, both the foreground image and the background image can use any suitable range of colors and are not limited to a single or constant color. Additional processing of the mask, the foreground image and the background image can be performed. The mask, the foreground image and the background image are encoded and combined into a single bitstream. Any number of suitable compression schemes can be used for encoding purposes. For decoding, a compressed bitstream is separated into a mask bitstream, a foreground bitstream and a background bitstream. The mask bitstream, the foreground bitstream and the background bitstream are decoded into a mask, a foreground image and a background image. Additional processing of the mask, the foreground image and the background image can be performed. The foreground image and the background image are combined into a recombined document image according to the mask.

According to yet another aspect of the invention, a mask separator receives a document image and generates a mask from the document image. The mask is represented in binary format. A foreground background segmenter receives the mask and the document image and segments the document image into a foreground image and a background image. A mask encoder encodes the mask into a mask bitstream. A foreground encoder encodes the foreground image into a foreground bitstream. A background encoder encodes the background into a background bitstream. A combiner component combines the mask bitstream, the foreground bitstream and the background bitstream into a combined bitstream.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
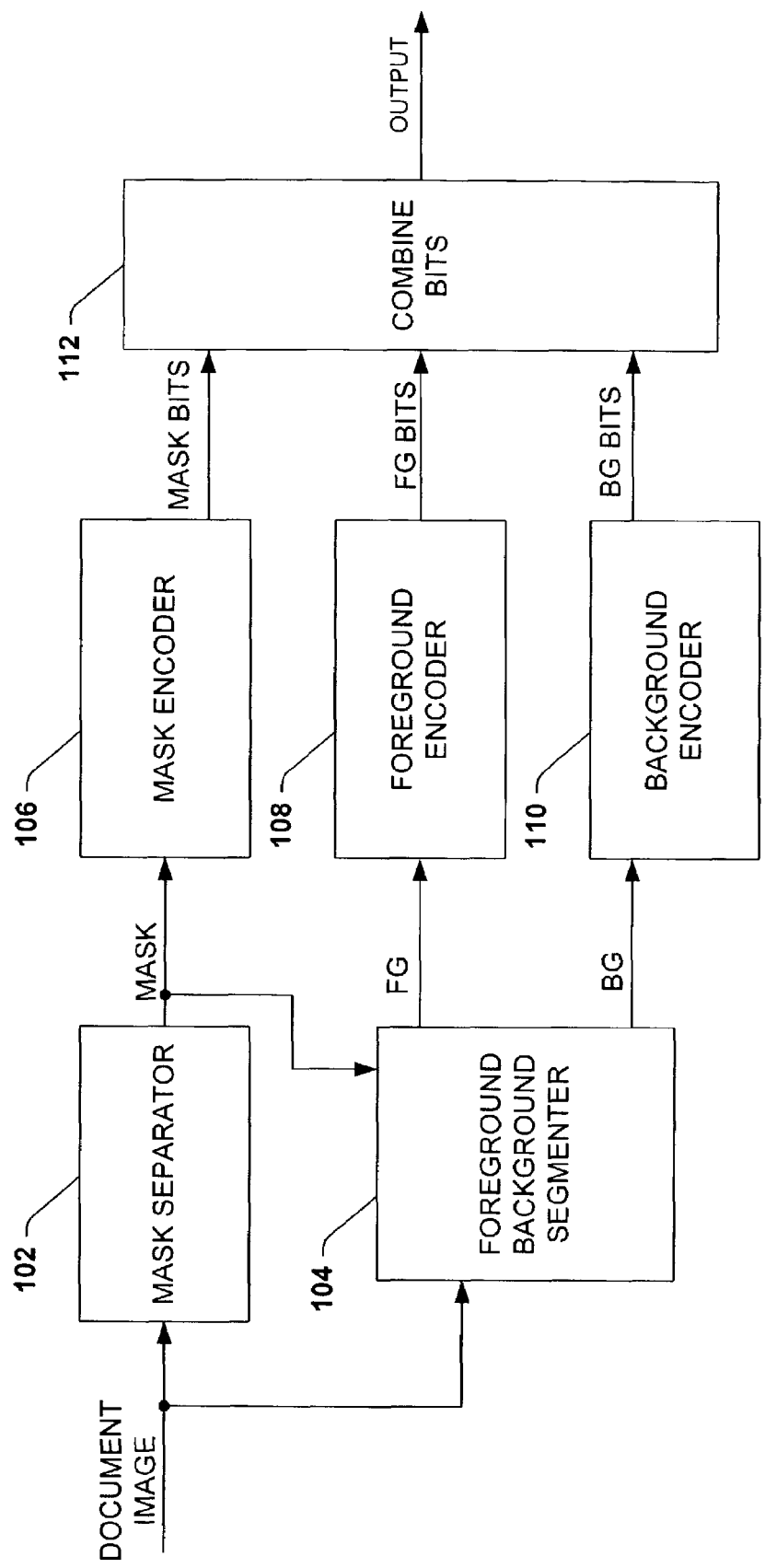
FIG. 1 is a block diagram of a segmented layered image encoding system according to one aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and/or thread of execution and a component may be localized on one computer and/or distributed between two or more computers.

Further, "document image" is intended to refer to a digital representation of document(s) comprising one or more color(s) (e.g., binary (black/white), gray-scale and/or color document(s)). Additionally, a document image can have image(s), text and/or text with images, with potential superimposition of text and images. A document image can comprise binary, RGB, YUV and/or other representations of document(s). An RGB document image is represented red, green and blue components. A YUV document image is represented using a luminescence component denoted by Y and chrominance components denoted by U and V. The YUV representation is, generally, more suitable for compression because the human eye is less sensitive to U and V distortion, and therefore U and V can be subsampled by a factor 2, and because Y captures the correlations between R, G and B. For the purpose of text clustering, the Y representation is particularly interesting because text is much easier to read when resulting from a change of luminance. Text resulting from a change of chrominance, for instance from red to green, at a given luminance, is much harder to read. A color document, can therefore be transformed into a YUV document, which can then be binarized, without much loss of textual information. A document image comprises picture elements commonly referred to as "pixels". A document image can be based on single or multi-page document(s) of any shape or size.

FIG. 1 is a high-level block diagram of a segmented layered image encoding system 100 according to one aspect of the invention. The system 100 identifies and compresses text, handwriting, drawings and the like, and the system can operate on single or multi-page documents of any suitable shape or size. The system 100 includes a mask separator 102, a foreground background segmenter 104, a mask encoder 106, a foreground encoder 108, a background encoder 110 and a combine component 112. The mask separator 102 receives a document image (e.g., digital representation of a document) and generates a mask. The document image can have one or more pages, and is typically scanned from a document. The document image can have any resolution, which is generally expressed as dots per inch (dpi). For example, faxed documents typically use a resolution of about 150–200 dpi. Additionally, the document image can have substantially any pixel size or document size, for example, 640 pixels by 480 pixels and/or A4 size.

The mask generated by the mask separator 102 can be employed to segment the document image into two layers, a foreground image and a background image. It is appreciated that alternate aspects of the invention can segment the image into more than two layers. The mask, also referred to as the mask image, is a binary image, where a pixel value determines whether that respective pixel belongs in the foreground image or the background image. The mask separator 102 generates the mask such that a combined size of the foreground image and the background image is reduced. It is appreciated that this concept can be extended to multiple masks and multiple foregrounds and still be in accordance with the present invention.

A number of approaches can be used to generate the mask. For compression, like pixel values compress better than differing pixel values. For example, a region of blue sky compresses better than a region of varying colors and intensities. As stated above, the mask is generated to reduce the combined size of the mask, the foreground image and the background image.

One approach that can be used is to generate a superset of possible masks and select a best mask of the superset. For a document image having N pixels, there are $2^N$ possible masks. Thus, it is possible to analyze every possible mask and determine which mask generates a smallest overall combined image. However, analyzing every possible mask can be computationally expensive, time consuming and generally is not practicable.

Another approach is to subdivide the document into regions, analyze each region to allocate pixels and merge regions based at least in part upon energy (e.g., energy variance). An energy variance (which is an estimate of compression that would be obtained) is a measure based on a sum of the square of distances. Small regions of the document, for example 2×2 pixels or 4×4 pixels, can be analyzed for energy variance. The small regions can be segmented into foreground and background regions such that the energy variance of that small region is reduced or minimized. Every possible mask can be used to determine which mask to use because the analyzed region is small enough to make such analysis feasible. For example, a 4 pixel region has only 16 possible permutations of a mask for that region. The small regions can then be merged (e.g., by pairs) together to generate the mask, overall, that reduces the combined size of the mask, the foreground image and the background image.

The foreground background segmenter 104 receives the mask from the mask separator 102 and the document image. The foreground background segmenter 104 uses the mask to segment the document image into the foreground image and the background image. For each pixel of the document image, a corresponding pixel of the mask is referenced. The pixel is allocated to the foreground image or the background image based on the corresponding pixel of the mask. For example, if the corresponding pixel of the mask is a "1", the pixel is assigned to the foreground image. Conversely, if the corresponding pixel of the mask is a "0", the pixel is assigned to the background image. It is appreciated however that whether "0" or "1" indicates foreground or background can be user-defined (e.g., "1" assigned to background and "0" assigned to foreground).

Additionally, the foreground image and the background image are disjoint of each other. However, additional processing of the mask can be performed to yield different foreground and background masks, which can sometimes overlap, to decrease artifacts along mask boundaries, or ignore certain pixels entirely, to increase compression. The foreground mask is then used to segment the foreground image from the document image and the background mask is used to segment the background image from the document image. In this case, the foreground image and the background image are not disjoint of each other but overlap slightly—such overlap can decrease compression but reduce edge effects. Even if the foreground mask and the background mask are employed to segment the document image, the foreground mask and the background mask are not required after the document image is segmented.

The background image and the foreground image have holes or vacant regions where pixels were assigned to the other image. These vacant regions can also be referred to as don't care pixels. In contrast, the non-vacant regions can be referred to as do care pixels. The vacant regions can be handled in any suitable manner so as to reduce overall compression size of the foreground and background images. One approach is to fill these vacant regions with don't care pixel values. The don't care pixel values are selected so as to increase compression and thereby, reduce size of the image. For example, an exemplary background image can be white but have don't care pixels where text was located. The don't care pixels, in this example, can be filled with white to improve compression. Another approach is to not fill the vacant regions and utilize a compression scheme that takes advantage of the vacant regions, such as for example masked wavelet compression. Other approaches can be used in accordance with the invention.

Additional processing can also be performed on the background image and the foreground image. The background and foreground images can be downsized to a lower resolution, thus reducing respective compressed size. For example, the background and foreground images can be downsized from 300 dpi to 100 dpi. Also, constant color connected components can be identified in the background and foreground images. Constant color connect components are a plurality of connected pixels having substantially the same color values. The constant color connected components can be identified by locating a seed pixel and utilizing an algorithm to determine substantially same color pixels connected thereto. A threshold value or minimum pixel can be set so that the constant color connected components have a minimum number of pixels. The identified constant color connected components can increase compression of the document image.

The mask encoder 106 receives the mask from the mask separator 102 and encodes the mask to generate compressed bits or a compressed mask stream of bits from the mask. Any suitable compression scheme can be used for the mask encoder 106. The mask is binary and typically includes textual information. Thus, a compression scheme should be select that compresses binary and textual information well. A bi-level compression scheme can be used to encode the mask.

A compression scheme that can be used to encode the mask is CCITT (Consultative Committee on International Telephone and Telegraph). The CCITT is currently known as ITU-T International Telecommunications Union-Telecommunications Sector (changed name in 1994)) which is a standards group and a name of a lossless compression technology for fax/modem communication. This type of compression works well with binary images. Typical compression ratios are 4:1 for the older version V.42bis, and 6:1 for newer version V.44 2000, which is based on the Lempel-Ziv-Jeff-Heath (LZJH) compression algorithm. It is to be appreciated that other suitable compression methods or schemes can be used to encode the mask in accordance with the present invention.

The foreground encoder 108 receives the foreground image from the foreground background segmenter 104 and encodes the foreground image into a foreground bitstream. The background encoder 110 receives the background image from the foreground background segmenter 104 and encodes the background image into a background bitstream. Any suitable compression scheme can be used for the foreground encoder 108 and the background encoder 110. For example, progressive wavelength encoding (PWC), progressive transform coding (PTC), JPEG, JPEG 2000, and masked wavelet compression schemes can be used to encode the foreground image or background region. For some compression schemes (e.g., masked wavelet), the foreground encoder 108 and the background encoder 110 can require the mask in order to encode the foreground image and the background image.

The combiner component 112 receives the compressed bits from the mask encoder 106, the foreground encoder 108 and the background encoder 110 and combines the bits into an output stream or output file. The combiner component 112 can include header information in the output file identifying or providing information such as encoding types, dictionaries and the like that can be used by a decoder to reconstruct the document image.

For illustrative purposes, the encoding system has been described as processing the entire image at once via the various components described supra. However, it is appreciated that overlapping scan regions can be used to reduce memory usage. For example, a first strip of 512 lines of the document image can be processed by the system. Then, a second strip overlapping the first strip by an overlap amount, such as 10 lines, is processed by the system. Subsequent strips are processed until the entire document image has been processed—the overlap amount facilitates mitigating variations between strips.

As stated above, the foreground image and the background image have vacant or don't care regions. The vacant regions can be handled a number of ways. One approach is to fill the vacant regions with data and then use a regular compression technique. A simple process to fill the vacant regions of the images is to fill those vacant regions with an average pixel value for that image. However, this process can create sharp discontinuities at the mask boundaries, can increase a required bit rate for a given peak signal-to-noise ratio (PSNR) and produce noticeable ringing near the mask or vacant region boundaries. Another process is to color each pixel with the color of the closest non-masked (or do care region) pixel. A standard morphology algorithm allows that process to be performed with only two passes over all the pixels leading to Voronoi-filled vacant regions under the mask. Then, when the foreground or background image is reconstructed, the reconstructed image is low-passed and then the known pixels are restored to their correct values. If the low-pass filter cutoff frequency is too low, sharp edges can occur causing an increase in the required bit rate and noticeable ringing near boundaries.

Another approach to handling vacant regions is to use projection onto convex sets. For example, consider two convex sets: the set of images that matches the input on the visible pixels, and the set of images that have certain wavelet coefficients set to zero (e.g. all high-frequency coefficients beyond a certain resolution level). By alternating projection onto those two sets, an image can be found that agrees with the visible pixels and which compresses well because of the many zero wavelet coefficients.

Yet another approach to addressing vacant regions is to employ wavelet transforms for the foreground encoder 108 and the background encoder 110 designed explicitly for irregular grids. Such wavelet decompositions are employed in connection with computer vision and compression of geometry data in computer graphics for example. Such wavelets are adapted to the irregular pattern of the mask.

A wavelet transform compression scheme that can be employed is a masked wavelet transform. The masked wavelet transform can be used for the foreground encoder 108 and the background encoder 110 where the wavelet function changes on a case-by-case basis as a function of the mask. It is appreciated that the mask is provided to the foreground encoder 108 and the background encoder, although not shown in FIG. 1, in order to use the masked wavelet transform compression scheme. For example, a regular conventional wavelet function may use k values for the prediction. However, with the mask and vacant regions, the regular wavelet function cannot handle pixels with no values, (e.g., don't care pixels in the don't care regions or vacant regions). In contrast, the changeable wavelet function employs only available values or visible regions of the foreground and the background images. Thus, the masked wavelet transform avoids the need to fill vacant regions with don't care pixels.

Figure 2:
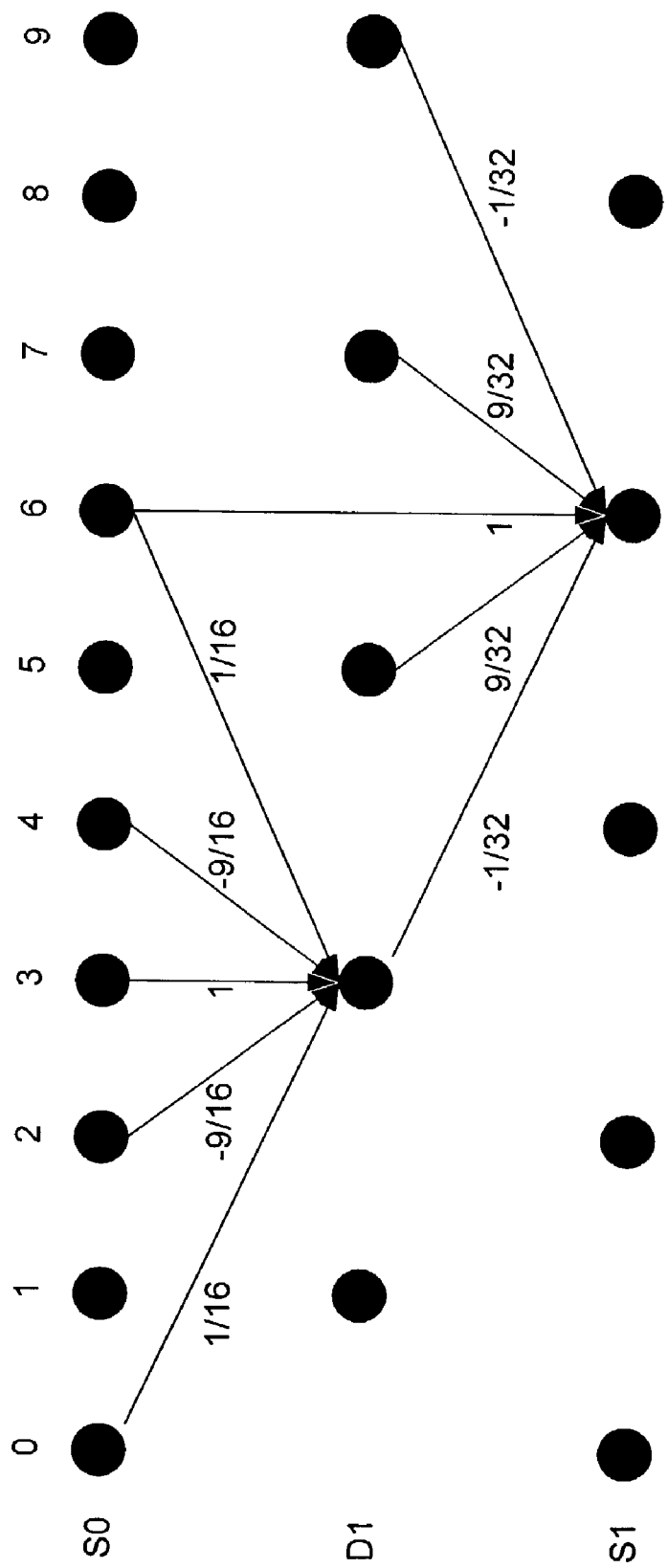
FIG. 2 is a diagram of one exemplary step of a wavelet computation.

FIG. 2 is a diagram of one step of a traditional computation of a wavelet using "lifting". The diagram illustrates, for a cubic wavelet, a prediction step at position 3, and a corresponding update step at position 6 (the other positions are omitted in the diagram for clarity). The coefficient next to each arrow indicates how to compute a linear combination in order to perform each step. For instance, a "detail" value (resulting from the high pass filter) at position 3 is computed by computing the following equation:

$$d_3 = s_3 - (-s_0 + 9s_2 + 9s_4 - s_6)/16 \quad \text{Eq. 1}$$

The update step is computed via the following equation:

$$s_6 = d_6 + (-d_3 + 9d_5 + 9d_7 - d_9)/32 \quad \text{Eq. 2}$$

Figure 3:
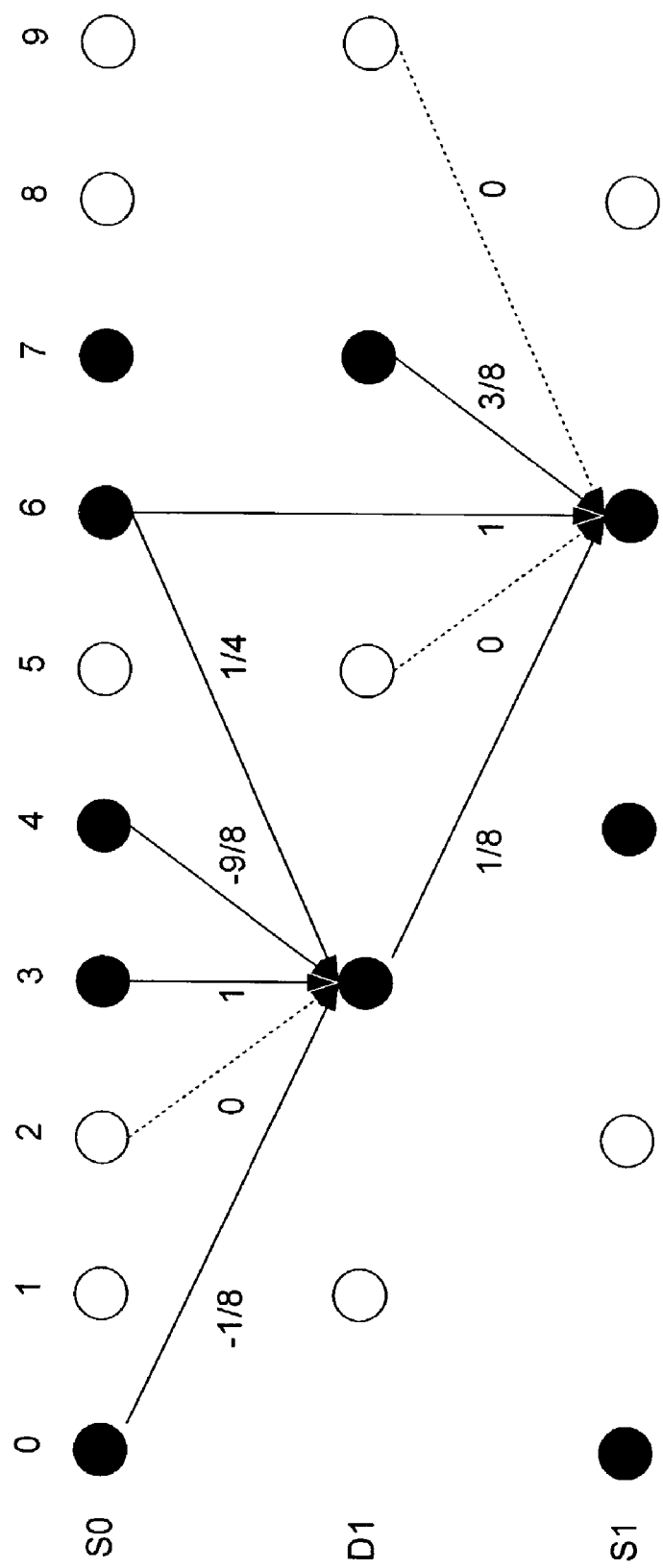
FIG. 3 is a diagram illustrating an exemplary step of a wavelet computation where some pixels are missing.

FIG. 3 illustrates a problem that arises when some pixel values are missing. In the diagram, no value is available for positions 1, 2, 5, 8, and 9. Obviously, computing a traditional cubic wavelet would not work because the result would depend on missing values. Setting the missing values to some constant (zero, or some average over the entire image) can introduce sharp discontinuities, which translate into poor compression and/or undesirable artifacts. In contrast, the masked wavelet compression scheme alters the wavelet function on a case-by-case basis as a function of the mask. For instance, during the prediction step of lifting, if k values are available for prediction, a polynomial of degree k−1 is used for interpolation. When only three values are available, a quadratic instead of cubic polynomial is employed. If only one value was available, a constant polynomial would be used, and the wavelet would be a Haar wavelet. Note that if the signal is a polynomial of degree k−1 and k pixels are not masked, the prediction is perfectly accurate.

Figure 4:
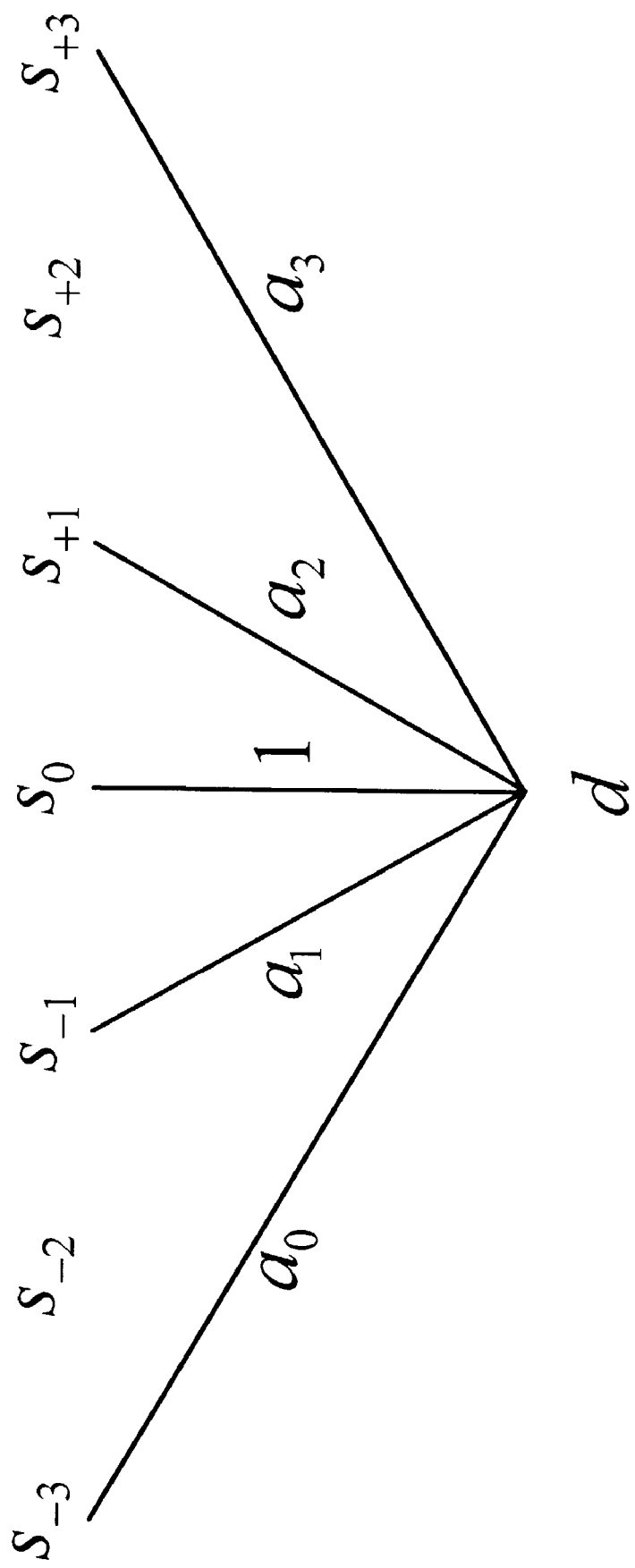
FIG. 4 is a diagram illustrating an exemplary step of a masked wavelet computation.

The masked wavelet transform compression scheme utilizes computation of a prediction for all the coefficients at odd positions from the coefficients at even positions. The difference between the odd coefficient and its prediction is the wavelet coefficient—this can be viewed as a high pass filter with some zeros at the odd positions. A signal s is centered on a position and indexed accordingly. For simplicity, the scheme is described with respect to a 7-tap filter, as shown in FIG. 4. FIG. 4 illustrates a lifting step where $s_0$ is predicted as a function of $s_{-3}, s_{-1}, s_1, s_3$ and the residual d is computed.

A filter a is indexed from 0 to i in accordance to the standard matrix notation. The wavelet coefficient d is provided by equation:

$$d = s_0 + \sum_{i=0}^{i=|k/2|} s_{2i-k/2} a_i \quad \text{Eq. 3}$$

where k is a number of taps in the filter (in this case k=7). The moments M of the high pass filter can be written as (setting $s_i = i^n$):

$$M_n = 0^n + \sum_{i=0}^{i=|k/2|} (2i - k/2)^n a_i \quad \text{Eq. 4}$$

Assuming that a regular signal can be approximated by a low order polynomial (using Taylor expansion) of order j, then a is chosen so as to set the first j+1 moment to zero. Then the wavelet transform will have many zeros and compress well. Thus, if k=7, a has 4 degrees of freedom and the first 4 moments are set to zero. These results are verified in the following system:

$$\begin{bmatrix} 1 & 1 & 1 & 1 \\ -3 & -1 & 1 & 3 \\ 9 & 1 & 1 & 9 \\ -27 & -1 & 1 & 27 \end{bmatrix} \begin{bmatrix} a_0 \\ a_1 \\ a_2 \\ a_3 \end{bmatrix} = \begin{bmatrix} -1 \\ 0 \\ 0 \\ 0 \end{bmatrix} \quad \text{Eq. 5}$$

which can be written in matrix notation as: wa=c. The solution to this system is the coefficients used in the well know cubic wavelet: a=[1/16,−9/16,−9/16,1/16].

The system is generalized to the case when a mask is present, such as the mask from FIG. 1. In other words, some of the coefficients $s_{2i-k/2}$ are missing, which can be modeled by introducing a matrix m, $$m = \begin{bmatrix} m_0 & 0 & 0 & 0 \\ 0 & m_1 & 0 & 0 \\ 0 & 0 & m_2 & 0 \\ 0 & 0 & 0 & m_3 \end{bmatrix} \quad \text{Eq. 6}$$

where $m_i \in \{0,1\}$, such that: wma=c. The effect of m is to remove column in the system of Eq. 5. Unfortunately, in this system, $a_i$ is under-determined when $m_i = 0$, and over-determined otherwise. The reason is that there are too many vanishing moments constraints imposed on the $a_i$ corresponding to visible pixels. This can be fixed by imposing that only first j moments should be 0, if there are j coefficients such that $m_i \neq 0$. This corresponds to retaining only the first j equations of the system in Eq. 5. For the under-determined coefficients $a_i$ (when $a_i$ is multiplied by $m_i = 0$), an arbitrary constraint $a_i = 0$ is added; and such can be accomplished in a single system:

$$(pwm + m - I)a = pc \quad \text{Eq. 7}$$

where I is the identity matrix, and:

$$p = \begin{bmatrix} p_0 & 0 & 0 & 0 \\ 0 & p_1 & 0 & 0 \\ 0 & 0 & p_2 & 0 \\ 0 & 0 & 0 & p_3 \end{bmatrix} \qquad \text{Eq. 8}$$

with $$p_i = (tr(m) > i)?1:0; \qquad \text{Eq. 9}$$

The constraints on $p_i$ ensure that lines in the system of Eq. 5 are removed from the bottom coefficients of the system of Eq. 5 for each 0 coefficient in m. In other words, if there are j coefficients $m_i$ which are not equal to 0, then $p_i=1$ for $i=[0 \ldots j-1]$, and $p_i=0$ otherwise. It can easily be verified that the system always has a unique solution for values of $m_i \in \{0,1\}$. The solutions for a for every possible values of m are provided by system Eq. 9 and summarized for the cubic wavelet in TABLE 1., system is 4.

TABLE 1

| $(m_0, m_1, m_2, m_3)$ | $a_0$ | $a_1$ | $a_2$ | $a_3$ |
|---|---|---|---|---|
| 0 0 0 0 | 0 | 0 | 0 | 0 |
| 0 0 0 1 | 0 | 0 | 0 | -1 |
| 0 0 1 0 | 0 | 0 | -1 | 0 |
| 0 0 1 1 | 0 | 0 | -3/2 | 1/2 |
| 0 1 0 0 | 0 | -1 | 0 | 0 |
| 0 1 0 1 | 0 | -3/4 | 0 | -1/4 |
| 0 1 1 0 | 0 | -1/2 | -1/2 | 0 |
| 0 1 1 1 | 0 | -3/8 | -3/4 | 1/8 |
| 1 0 0 0 | -1 | 0 | 0 | 0 |
| 1 0 0 1 | -1/2 | 0 | 0 | -1/2 |
| 1 0 1 0 | -1/4 | 0 | -3/4 | 0 |
| 1 0 1 1 | -1/8 | 0 | -9/8 | 1/4 |
| 1 1 0 0 | 1/2 | -3/2 | 0 | 0 |
| 1 1 0 1 | 1/4 | -9/8 | 0 | -1/8 |
| 1 1 1 0 | 1/8 | -3/4 | -3/8 | 0 |
| 1 1 1 1 | 1/16 | -9/16 | -9/16 | 1/16 |

Next, the signal s is updated with the predictions from above. In the update step, it is desirable for the first moments of the low pass filter to vanish, after the signal has been multiplied by $(-1)^i$. In other words, if a regular signal (e.g., can be written as a lower order polynomial) is multiplied by the highest frequency signal, $(-1)^i$, then the low pass filter should output zero. This condition can easily be cast as 0-moment constraint, as in the previous section, except that the input will be of the form $s_i = (-1)^i i^n$ instead of $s_i = i^n$. Using similar notation as for the predict step, the update step corresponds to the equation:

$$s = s_0 + \sum_{i=0}^{i=|k/2|} d_{2i-k/2} b_i \qquad \text{Eq. 10}$$

Where k is the number of tap in the filter (in this case k=7). The moments of the low pass filter can be written as $$M_n = 0^n + \sum_{i=0}^{i=|k/2|} d_{2i-k/2} b_i \qquad \text{Eq. 11}$$

but, for each $d_i$, the equation can be rewritten locally as (assuming $s_i = (-1)^i i^n$):

$$d_j = s_j + \sum_{i=0}^{i=|k/2|} s_{j+2i-k/2} a_i = -j^n + \sum_{i=0}^{i=|k/2|} (j+2i-k/2)^n a_i \qquad \text{Eq. 12}$$

since j and k/2 are odd. Because individual $a_i$ are set to generate zero moments, the following is true:

$$0 = j^n + \sum_{i=0}^{i=|k/2|} (j+2i-k/2)^n a_i \qquad \text{Eq. 13}$$

which implies $d_j = -2j^n$. Thus:

$$M_n = 0^n + \sum_{i=0}^{i=|k/2|} -2(2i-k/2)^n b_i \qquad \text{Eq. 14}$$

For the wavelet to compress as well as a regular signal, as many moments as possible should be equal to zero as possible. Since there are 4 degrees of freedom, the first 4 moments can be set to zero. It is easy to verify this results in the following system:

$$\begin{bmatrix} 1 & 1 & 1 & 1 \\ -3 & -1 & 1 & 3 \\ 9 & 1 & 1 & 9 \\ -27 & -1 & 1 & 27 \end{bmatrix} \begin{bmatrix} b_0 \\ b_1 \\ b_2 \\ b_3 \end{bmatrix} = \begin{bmatrix} 1/2 \\ 0 \\ 0 \\ 0 \end{bmatrix} \qquad \text{Eq. 15}$$

Which can be written in matrix notation as wb=c'. The solution to this system are the coefficients used in the well know cubic wavelet: $b=[-1/32, 9/32, 9/32, -1/32]$.

Now, it is assumed that some of the coefficients $s_i$ are missing. First, it is assumed that all missing values are only at even locations. This system can be solved in a similar fashion as before to verify that:

$$(pwm+m-I)b=pc' \qquad \text{Eq. 16}$$

Note that m and p matrix depend on the location centered in $s_0$. Each location views a different part of the mask and has therefore its own m and p. Solutions to Eq. 16 are provided in TABLE 2, illustrated below, which depict solutions of equation Eq. 16 for different values of m when the dimension of the system is 4. To derive Eq. 16, the odd locations were assumed not masked. If some odd locations are masked, but the number of masked value is less than n, then $d_j = -2j^n$ and Eq. 16 holds. Otherwise, there are two many masked pixels in the predict step to nullify the n-th moment in the update step (the wavelet coefficient will still be as small, but not zero). The inverse wavelet transform is easily computed by undoing each step locally, thanks to the lifting formalism.

TABLE 2

| $(m_0, m_1, m_2, m_3)$ | $b_0$ | $b_1$ | $b_2$ | $b_3$ |
|---|---|---|---|---|
| 0 0 0 0 | 0 | 0 | 0 | 0 |
| 0 0 0 1 | 0 | 0 | 0 | 1/2 |

TABLE 2-continued

| $(m_0, m_1, m_2, m_3)$ | $b_0$ | $b_1$ | $b_2$ | $b_3$ |
|---|---|---|---|---|
| 0 0 1 0 | 0 | 0 | 1/2 | 0 |
| 0 0 1 1 | 0 | 0 | 3/4 | −1/4 |
| 0 1 0 0 | 0 | 1/2 | 0 | 0 |
| 0 1 0 1 | 0 | 3/8 | 0 | 1/8 |
| 0 1 1 0 | 0 | 1/4 | 1/4 | 0 |
| 0 1 1 1 | 0 | 3/16 | 3/8 | −1/16 |
| 1 0 0 0 | 1/2 | 0 | 0 | 0 |
| 1 0 0 1 | 1/4 | 0 | 0 | 1/4 |
| 1 0 1 0 | 1/8 | 0 | 3/8 | 0 |
| 1 0 1 1 | 1/16 | 0 | 9/16 | −1/8 |
| 1 1 0 0 | −1/4 | 3/4 | 0 | 0 |
| 1 1 0 1 | −1/8 | 9/16 | 0 | 1/16 |
| 1 1 1 0 | −1/16 | 3/8 | 3/16 | 0 |
| 1 1 1 1 | −1/32 | 9/32 | 9/32 | −1/32 |

Thus, the masked wavelet transform can be employed to encode the foreground image and the background image without filling the vacant regions. However, it is appreciated that varying implementations can employ other encoding methods or compression schemes which fill the vacant regions with don't care values as discussed above.

Figure 5:
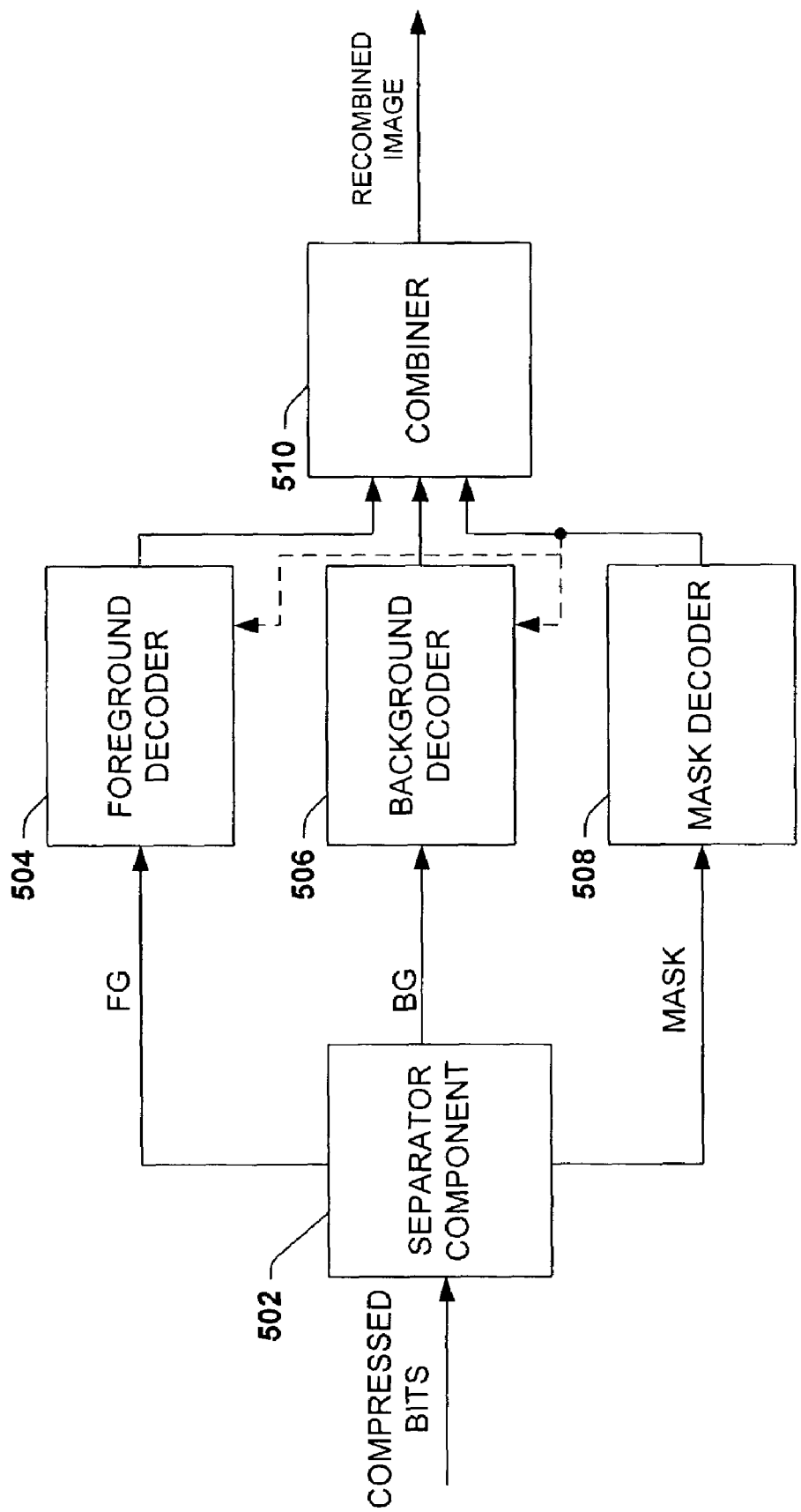
FIG. 5 is a block diagram of a segmented layered image decoding system according to one aspect of the invention.

FIG. 5 is a block diagram of a segmented layered image decoding system according to one aspect of the invention. The system receives a compressed bitstream and generates a recombined image from the compressed bitstream. The system includes a separator component 502, a foreground decoder 504, a background decoder 506, a mask decoder 508 and a combiner 510.

The separator component 502 receives the compressed bits and separates the bits to form a foreground bitstream, background bitstream and mask bitstream. The separator component 502 can utilize header information to separate the bitstreams. The foreground decoder 504 decompresses the foreground bitstream to yield a foreground image. The background decoder 506 decompresses the background bitstream to yield a background image. The foreground decoder 504 and the background decoder 506 can use any number of decompression schemes such as, for example, progressive waveform or progressive transform.

The mask decoder 508 decompresses the mask bitstream to yield a mask or mask image. The mask decoder 508 can also retrieve layout and/or re-flow information. Additionally, the mask decoder 508 can obtain a dictionary used for reconstructing textual information. The mask decoder 508 typically utilizes a bi-level decompression scheme. For some compression schemes (e.g., masked wavelet), the foreground decoder 504 and the background decoder 506 can require the decompressed mask from the mask decoder 508 in order to obtain the foreground image and the background image.

The combiner 510 combines the foreground image, the background image and the mask into a recombined document image. The recombined image is identical to or an approximation to an original document image. Additionally, the recombined image can have a different shape and/or size depending on a desired display. For example, a scan of a letter-sized document could be displayed differently on a portable device having a much smaller screen. The combiner 510 generates pixels for the recombined document image from the foreground and background images based on the mask. Each pixel of the recombined document image is determined by referencing a corresponding pixel of the mask thereby determining whether the pixel of the recombined document should come from the foreground image or the background image. For example, a mask pixel value of 1 can indicate that the pixel of the recombined document should come from the corresponding pixel of the foreground image.

Figure 6:
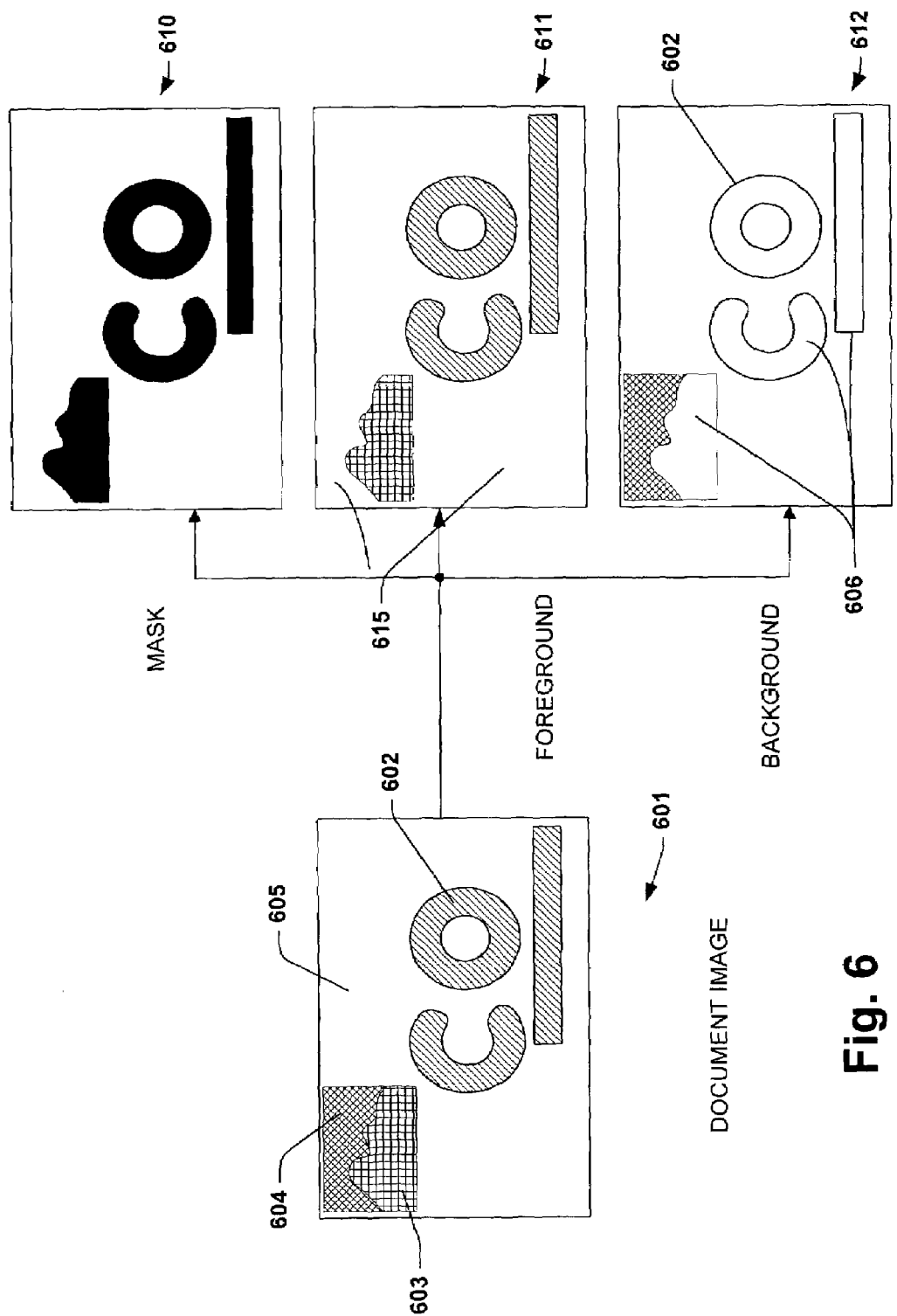
FIG. 6 illustrates a sample document image according to one aspect of the present invention.

FIG. 6 illustrates sample document images according to an aspect of the present invention. FIG. 6 is exemplary and is intended only to further illustrate the present invention. A document image 601 is shown with a variety of colors and/or shades. The document image 601 is a typical document image that includes textual information 602 and image information 604 and 603 and a background 605. The patterns shown in FIG. 6 illustrate different shades or colors. Thus, the textual information 602 can be of a different color than the image information 603 and 604 or the background 605. Additionally, the information can use any suitable number of colors. According the present invention, such as using the system of FIG. 1, the document image 601 is segmented into 3 components, a mask 610, a foreground image 611 and a background image 612. Other aspects of the invention can segment a document image into more than two or three layers.

The mask 610 is a binary image and, thus is shown only with black and white regions. The mask 610 determines or allocates whether pixels of the document image 601 go to the foreground image 611 or the background image 612. The mask 610 is also employed to generate a reconstructed document image by determining which pixels of the foreground image 611 and the background image 612 are in the reconstructed document. The reconstructed document is identical or approximates the document image 601.

As can be seen in FIG. 6, the foreground image 611 includes portions of the document image 601 as indicated in the mask 610. Black pixels of this mask 610, allocate pixels of the document image 601 to the foreground image 611. Other portions of the foreground image 603 can be filled with don't care pixels 615. As stated above, the don't care pixels 615 increase compression but are not present in the reconstructed image. Similarly, the background image 612 includes portions of the document image 601 as indicated by the mask 610. White pixels of this mask 610 allocate pixels of the document image 601 to the background image 612. Other portions of the background image 604 can be filled with don't care pixels 606 as shown in FIG. 6. The don't care pixels 606 are present for compression purposes and are not included in the reconstructed image. An outline of the textual information 602 is shown in the background image 612 for illustrative purposes. However, it is appreciated that the textual information 602 can be filled with don't care pixels matching the background 605 such that the textual information 602 is not visible in the background image 612.

As is stated above, FIG. 6 is but one example of many possible document images according to the present invention. Many variations of the images can be made and still be in accordance with the present invention.

Figure 7:
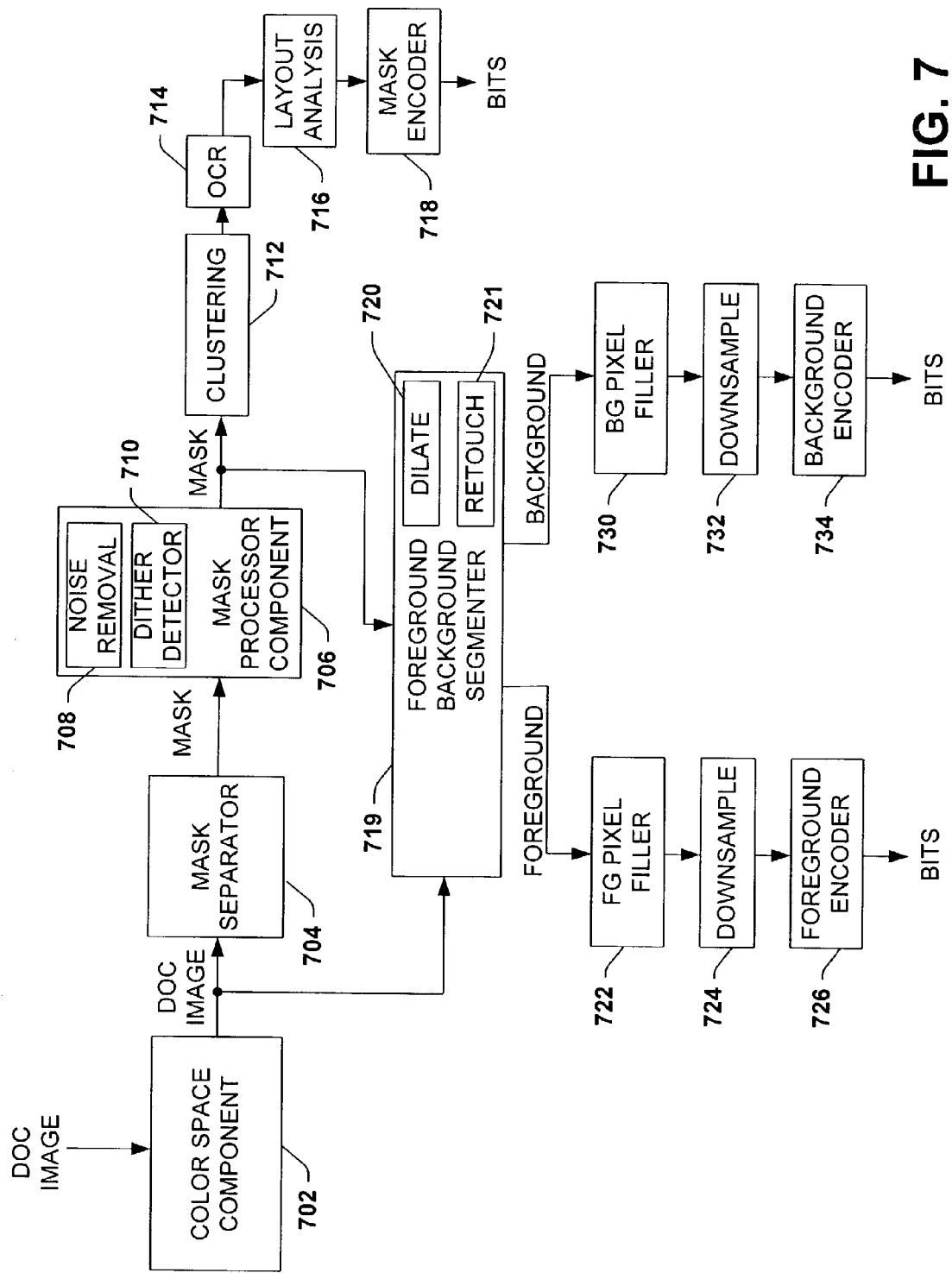
FIG. 7 is a block diagram of a segmented layered image encoding system according to one aspect of the invention.

FIG. 7 is a block diagram of a segmented layered image encoding system according to one aspect of the invention. The system can identify information such as text, handwriting, drawings and the like in a document and compress the document. The system operates on single or multi-page documents of any suitable shape or size.

A colorspace converter 702 operates on a document image to convert a colorspace of the document image. The colorspace refers to how colors are represented in the document image. The colorspace generally has a number of components that provide a color on a pixel-by-pixel basis. For example, an image can be represented with an RGB (red, green and blue) colorspace where each pixel has a value for each of the RGB components. Additionally, a transparency component can be included to indicate a transparency of the pixel. The overall color of the pixel is obtained by the combination of these components. For example, white can be obtained by using RGB values of 255, 255 and 255 (assuming 8 bits per component) and blue can be obtained by RGB values of 0, 0 and 200. The RGB colorspace is often employed for displaying images and/or scanning documents. However, the RGB colorspace can hinder compression.

Colors in a document are, generally, correlated and/or interrelated. For an RGB colorspace, the components are compressed individually (by channel) which results in the same information being coded multiple times. Compression of the document image can be improved by converting the colorspace of the document to a more compressible colorspace.

One possible colorspace conversion is to convert the document image from the RGB colorspace to a YUV colorspace. The Y, U and V components are luminescence, chrominance red and chrominance blue components, respectively. YUV was originally developed for television viewing. The conversion was developed based on viewing preferences, not compressibility. Thus, the document image can be converted from the RGB colorspace to the YUV colorspace using the following equation:

$$Y = 0.6G + 0.3R + 0.1B$$
$$U = R - Y \qquad \text{Eq. 17}$$
$$V = B - Y$$

The YUV colorspace does, provide better compression compared to the RGB colorspace because it utilizes correlation between the components so that the same information isn't coded multiple times. Most of the correlation information is contained in the Y component. Eq. 17 illustrates that the YUV components can be represented by smaller values than corresponding RGB components. However, as stated above, the YUV colorspace was not designed for compressibility, but more for viewability. It is appreciated that the document image can be converted back to RGB colorspace for any suitable purpose, such as for example displaying, by modifying Eq. 17.

Another colorspace conversion is to convert the document image from the RGB colorspace to an $YC_oC_g$ colorspace. The $YC_oC_g$ representation utilizes luminescence represented by Y, chrominance-orange represented by $C_o$ and chrominance-green represented by $C_g$. The RGB components can be mapped to $YC_oC_g$ (e.g., as an alternative to the conventional Y U V described above) utilizing the transform.

$$\begin{bmatrix} Y \\ C_o \\ C_g \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix} \Leftrightarrow \begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ C_o \\ C_g \end{bmatrix} \qquad \text{Eq. 18}$$

Significantly, an advantage of YCoCg color space mapping is that from RGB to YCoCg and the inverse conversion from YCoCg to RGB can be accomplished utilizing integer arithmetic. Further, the inverse conversion can be performed without multiplication. The $YC_oC_g$ color space representation can result in significantly better compression performance than the popular YUV because it is a better approximation to the statistically optimal spaces that are obtained from a principal component analysis on modern digital picture data. The advanced $YC_oC_g$ colorspace is not designed for viewing purposes, but for compression purposes. Furthermore, since the equations or transform of Eq. 18 utilizes integer arithmetic, the document image can be converted to the $YC_oC_g$ colorspace in a computationally efficient manner.

It is appreciated that the colorspace converter 702 can convert the document image from any colorspace to any colorspace. For example, the colorspace converter 702 could convert a document image from a YUV colorspace to an YCoCg colorspace. Additionally, if the document image is already in the preferred colorspace, no conversion is performed.

The mask separator 704 receives a document image from the color space component 702 and generates a mask. The mask generated by the mask separator 704 is employed to segment the document image into two layers, a foreground image and a background image. It is appreciated that alternate aspects of the invention can segment the image into more than two layers. The mask, also referred to as the mask image, is a binary image, where a value of each pixel determines whether that pixel belongs in the foreground image or the background image. The mask separator 704 generates the mask that reduces a combined size of the mask, the foreground image and the background image.

A number of approaches can be employed to generate the mask. For compression, similar pixel values compress better than dissimilar pixel values. For example, a region of blue sky compresses better than a region of varying colors and intensities. As stated above, the mask is generated to reduce the combined size of the mask, the foreground image and the background image.

One approach that can be employed is to generate all possible masks and simply pick the best one. For a document image having N pixels, there are $2^N$ possible masks. Thus, it is possible to go through every possible mask and determine which one generates the smallest overall combined images. However, going through every possible mask is computationally expensive, time consuming and generally, not feasible.

Another approach is to subdivide the document into regions, analyze each region to allocate pixels and merge the regions. An energy variance, which is an estimate of compression that would be obtained, is a measure based on a sum of the square of distances. Small regions of the document, for example 2×2 pixels or 4×4 pixels, can be analyzed for energy variance. The small regions can be segmented into foreground and background regions such that the energy variance of that small region is reduced or minimized. Every possible mask can be analyzed to determine which mask to employ because the region is small enough that such analysis is practicable. For example, a 4 pixel region has only 16 possible permutations of a mask for that region. The small regions can then be merged together to generate the mask, overall, that reduces the combined size of the mask, the foreground image and the background image.

Another approach to generating a mask assumes that the foreground and the background are constant over a region, and a mask is generated which minimizes or substantially reduces the variance or energy variance around those constants. The variance here is used as an estimate of the compression obtainable for both the foreground and the background, instead of actually generating the mask, segmenting the document image to get the foreground and background image and compressing them. The energy variance, as discussed above, which is also an energy measure (a sum of the square distances), is an acceptable estimate of the size of the foreground and background after compression. First, the cost of compressing the mask is completely ignored. Further steps can take the size of the mask into account.

Assume for a given region, that the region is a set S of N pixels, and that F and B are a partition S (i.e. F∪B=S and F∩B=∅). If $f(x)$ is the image value at pixel location x,x∈S, the variance of the foreground and background are respectively:

$$v_F = \sum_{x \in F} (f(x) - \mu_F)^2 \quad \text{Eq. 19}$$

$$v_B = \sum_{x \in B} (f(x) - \mu_B)^2 \quad \text{Eq. 20}$$

Where $$\mu_F = \frac{1}{N_F} \sum_{x \in F} f(x) \text{ and } \mu_B = \frac{1}{N_B} \sum_{x \in B} f(x)$$

are respectively the mean of the foreground and the background, and $N_F$ and $N_B$ are respectively the number of pixels in the foreground and the background. Note that these variances can also be expressed as:

$$v_F = \sum_{x \in F} f(x)^2 - N_F \mu_F^2 \quad \text{Eq. 21}$$

$$v_B = \sum_{x \in B} f(x)^2 - N_B \mu_B^2 \quad \text{Eq. 22}$$

A suitable partition F and B of S, which will minimize the sum $E = v_F + v_B$ is to be found. Even with this simplification, the problem is still extraordinarily hard since there are still have $2^N$ possible masks. Thus, the image is further partitioned into 2×2 pixel sub-images. On each 2×2 sub-image, there are only $2^4 = 16$ possible masks, which means that on each of such regions, it is possible to determine optimal F and B, that minimize $E = v_F + v_B$ (by trying all 16 combination and keeping the one with smallest energy. It turns out that it is not necessary to try all 16 combinations. The problem is equivalent to a K-means problem where K=2, and since $f$ (the image) is a scalar function, the values $f(x)$ can be sorted which yield a solution, which can be computed very efficiently: sort all 4 pixel value, and determine which one of the 3 partitions (respecting the sorting) yield lowest energy. The partial sum can be reused in each partition to minimize the number of operations.

This solution, however, has the drawback that every 2×2 sub-region has a distinct foreground and background which can pick up even the slightest pixel noise, resulting in an inadequate mask. The next step involves combining adjacent regions. For example, supposing 2 regions, 1 and 2, and their corresponding foreground and background, $F_1, B_1$ and $F_2, B_2$. When combining these 4 sets, there are in effect seven distinct possibilities:

TABLE 3

| New F | New B |
|---|---|
| F1 | B1, F2, B2 |
| F1, B1, F2 | B2 |
| F1, F2, B2 | B1 |
| F2 | F1, B1, B2 |
| F1, F2 | B1, B2 |
| F1, B1 | F1, F2 |
| F1, B2 | B1, F2 |

The winning combination is the combination that has the lowest resulting energy $E = v_F + v_B$. Note that all seven combinations can be tried, or the average in foregrounds and backgrounds can be sorted and only the partitions that respect the sorting are considered. Furthermore, if each region retains quantities $$\sum_F f(x), \sum_F f(x)^2$$

and $N_F$ for the foreground and $$\sum_B f(x), \sum_B f(x)^2$$

and $N_B$, the combinations for E can be computed in constant time. After merging, these quantities must usually be recomputed, but fortunately, this is also accomplished in constant time. Also note that the sum $\Sigma f(x)^2$ over the regions is constant for each partition, and need not be calculated for the purpose of selecting an optimal partition. This sum $\Sigma f(x)^2$ over the regions can also be employed to determine when not to merge regions, as is shown below.

Combining adjacent regions can proceed by combining the horizontally adjacent 2×2 regions into 2×4 regions, followed by combining the vertically adjacent 2×4 regions into 4×4 regions. The 4×4 regions are combined into 8×8 regions and so on until only one region is left, which is partitioned into foreground and background.

Unfortunately, such a technique can lead to merges which place several gray levels into the foreground or into the background, with a potential loss of important details such as text, whenever there are more than 2 colors in a region. For example if region 1 has text written in gray over white, and region 2 is mostly black, the merge of the two regions can lead to gray and white being placed in the foreground and black being placed in the background of the resulting region, losing the textual information. However, whenever two colors are merged in either foreground or background, a sharp increase of energy (or variance) is noticed for that region, since a constant is no longer a good model for such region. Accordingly, it is desirable to employ an algorithm so as not to merge adjacent region if the energy E exceed a certain threshold K which is determined experimentally. This algorithm yields a mask, which captures most of the text and graphic lines in a page.

This algorithm however has a number of refinements—one of which is to employ simple regions. A 1-region energy of small regions (for example 4×4) can be measured and if the energy is sufficiently low (employing another threshold determined experimentally), the entire region can be placed into the foreground or background. Thus, partitioning of the small regions can, if the energy is lower than a threshold, be avoided thereby accelerating the operation of the algorithm. Instead of utilizing a constant assumption for foreground and background, a polynomial regression can be employed to represent the foreground and background. For example, if the polynomials are planes of equation $\alpha x + \beta y + \mu$, the energy would be defined by:

$$v_F = \sum_{x,y \in F} (f(x, y) - \alpha_F x + \beta_F y + \mu_F)^2 \qquad \text{Eq. 23}$$

$$v_B = \sum_{x,y \in B} (f(x, y) - \alpha_B x + \beta_B y + \mu_B)^2 \qquad \text{Eq. 24}$$

Where x,y index the pixel locations, and $\alpha_F, \beta_F$ and $\mu_F$ are scalars that minimize $v_F$ and $\alpha_B, \beta_B$ and $\mu_B$ are scalars that minimize $v_B$. Note that $\alpha_F, \beta_F$ and $\mu_F$ can be solved in constant time using the quantities $\Sigma f(x,y)^2, \Sigma f(x,y)x, \Sigma f(x,y)y$, and $\Sigma f(x,y)$. This is a linear system of three unknown and three equations, and the same applies to $\alpha_B, \beta_B$ and $\mu_B$. As before, the algorithm is bottom-up and minimizes E at each merge. The foregrounds and backgrounds cannot be sorted by average, and therefore all seven combinations are tested to determine which combination minimizes E. To keep performing each test and merge in constant time, the quantities $\Sigma f(x,y)^2, \Sigma f(x,y)x, \Sigma f(x,y)y, \Sigma f(x,y)$ and N should be maintained for each region for the foreground and the background. The simple region optimization is still possible, but could assume a constant over the region, a polynomial regression, or both.

A mask processor component 706 performs any number of processing operations on the mask. The mask processor component includes a noise removal component 708, and a dither detector 710. It is appreciated that alternate aspects of the invention can include other mask processing components. It is further appreciated that alternate aspects of the invention can include less or more processing components.

The noise removal component 708 removes noise from the mask. As discussed above, digital documents are typically created by scanning in standard documents. A certain amount of noise is almost always introduced into the digital document via the scanning and digitizing process. For example, fingerprints on a scanner tray or a fold in a document can cause noise and/or erroneous marks to be included in the document image. The noise removal component 708 first attempts to identify noise in the mask. A variety of approaches can be employed to identify noise in the mask. One approach is to analyze the mask for connected components. Connected components are connected pixels of the same color, for example black. The mask can be scanned left to right, top to bottom, page by page searching for connected components. The connected components can be stored with positional and shape or bitmap information. Then, each pixel of the document is analyzed to determine whether it is noise or not. Thus, for each pixel, a surrounding region, such as all the pixels within a five pixels distance, is analyzed to determine a number of connected components in and/or intersecting the surrounding region. If the number of connected components is less than a threshold amount, the pixel is considered to be noise and removed from the mask. Then, the pixel is assigned to the foreground or background images of the document according to whichever provides better compression. Other approaches can be used and still be in accordance with the present invention.

Generally, the noise removal component 708 can identify pixels that appear to be random and/or unrelated to text or image in the document. It is appreciated that the noise removal component 708 does not necessarily remove all the noise from the document. The noise removal component 708 removes the identified noise from the mask by assigning those pixels to the foreground image or the background image. Additionally, the noise can be removed by, for example, replacing pixels identified as noise with the values of surrounding pixels.

The dither detector 710 detects dithering in the mask and removes dithering from the mask. Dithering is a technique employed in computer graphics to create the illusion of varying shades of gray on a monochrome display or printer, or additional colors on a color display or printer. Dithering relies on treating areas of an image as groups of dots that are colored in different patterns. Akin to the print images called halftones, dithering takes advantage of the eye's tendency to blur spots of different colors by averaging their effects and merging them into a single perceived shade or color. Depending on the ratio of black dots to white dots within a given area, the overall effect is of a particular shade of gray. Dithering is employed to add realism to computer graphics and to soften jagged edges in curves and diagonal lines at low resolutions. However, dithering can be problematic for document images. Dithering, if not appropriately detected and handled, can be misinterpreted as text, handwriting or a graphic.

The dither detector 710 identifies dithering regions in the mask—the regions can be divided such that each region or subregion has a similar dithering pattern. The dither detector 710 removes or handles the identified dithering regions. For example, the dither detector 710 could identify a dithering region as being a light gray. The dither detector 710 could simply remove the dithering region, or set the region to a light gray. It is appreciated that changing a region to a shade would also involve modifying the document image. The dither detector 710 can also reallocate the identified dithering regions to the foreground or background by modifying the mask.

A number of approaches can be employed to detect and/or handle dithering. One approach is to analyze the mask for connected components. Connected components are connected pixels of the same color, for example black. The mask can be scanned left to right, top to bottom, page by page searching for connected components. The connected components can be stored with positional and shape or bitmap information. For each pixel of the mask, a quantity or number of connected components in and/or intersecting a surrounding region is determined. The surrounding region can be a number of pixels surrounding the pixel, such as 7. If the number of connected components in the region is greater than a threshold, dithering is removed. Then, the pixel can be assigned to either the foreground or background image, thus removing the dithering. This assignment can be determined by computing a quantity of pixels in the background of the region and a quantity of pixels in the foreground of the region. Then, the pixel can be assigned the foreground if the quantity of pixels in the foreground of the region is greater than the quantity of pixels in the background of the region, otherwise the pixel can be assigned to the background. Other approaches for identifying and/or handling dithering or half toning can be employed with the present invention.

A clustering component 712 identifies clusters in the mask. The clustering component 712 locates connected components in the mask. A connected component, as described above is a plurality of connected pixels, and can be either a four direction connected component or an eight direction connected component, for example. After locating the connected components in the mask, the clustering component 712 identifies similar connected components and groups them as clusters. A cluster is a group of similar connected components. Generally, a cluster represents an alphanumeric character, including handwriting, but can include other information as well. However, there can be a number of clusters representing a single character. Clustering can dramatically increase compression.

The reason for increase in compression and the reduction in file size, is that each connected component is summarized by a position, and a pointer to a shape, belonging to a dictionary of shapes. The shape is the bitmap or "image" of the connected component or cluster. The connected component is also referred to as a mark. The clustering aspect of the algorithm is to determine which shape should belong to the dictionary, and which shape is closest to each connected component. Typically the dictionary of shapes is a fraction of the file size, and can even be shared across pages. The pointers to the shapes are characterized by a position in the page (X and Y), and a shape number. The X and Y position can be compressed using previous position, while the shape indices are compressed using context or a language model.

A number of approaches can be utilized by the clustering component 712 to identify clusters. One approach is to compare shapes of marks to each other and identify marks that are similar and/or identical. Another approach employs properties of existing clusters and properties of marks or connected components. The existing clusters are groups of at least one mark, that have previously been defined as clusters. Properties of an extracted mark from a document are compared to the existing cluster properties. Such comparison does not require a timely and expensive, bit by bit, comparison to identify mismatches. If a mark property fails to match any existing cluster properties, and if the mark is deemed to be too far from any of the existing clusters, the mark is added as a new cluster and a bit by bit comparison is avoided. This approach distinguish itself from other approaches by both a computationally efficient screening for detecting mismatches, and a computationally efficient algorithm for detecting positive matches for the clustering.

One particular property of the clusters that can be employed is x size and y size. The x size and y size provides sizing information of the existing clusters. An x size and a y size of a mark can be compared to the x size and y size of existing clusters to identify mismatches. One aspect of the invention is to organize the clusters in a 2D table of buckets, indexed by x size and y-size. When a new mark is found, the bucket of identical x size and y size is extracted, and the mark is compared to the clusters in the bucket. Adjacent buckets can also be searched for more accurate matches (all the other buckets will be ignored or screened). The "no drift" assumption, described infra, on the cluster center is useful here, because it guarantees that clusters stay in their bucket.

One property that can be employed for comparison of the mark to the existing clusters is ink size. The ink size generally refers to a ratio of black pixels to total pixels in a mark or cluster. Similarly, an ink size of a mark can be compared to the ink size of existing clusters to identify mismatches. Another property of the mark is a "hot point". The hot point is a location on the mark, which can be the center of gravity, or computed by other mean (for instance the line equation of the surrounding characters. During comparison, the hot points of the mark and the cluster are aligned before the comparison begins, often resulting in a translation. Yet another property is a reduced mark or image, which is a pixel size reduced version a bitmap of the mark and/or cluster. In one aspect of the invention, the reduced mark is centered on the hot point, and the mark is resealed so that the reduced mark has a fixed size. Again, the non-drifting assumption of the cluster is useful in guaranteeing that the reduced version of a cluster is a good representation of the all mark in the cluster. The reduced mark can be compared to the reduced mark or reduced image of existing clusters to identify mismatches.

When a mark succeeds all the properties tests, it is then compared to the cluster in a more direct way. A distance between the mark and the cluster is computed, and compared to a first threshold. If the distance is within a threshold, the mark is added to the existing cluster. The mark can be added to the first acceptable existing cluster or the mark can be added to the existing cluster having the least distance from the comparison with the mark.

Additionally, the clusters can be characterized by the first element placed in the cluster. An advantage of such approach is that adding a new mark to a cluster does not require re-computation of the cluster's characteristics. Another advantage of this approach is that it avoids "cluster drift", which occurs when the cluster center moves with every addition of a new mark to the cluster. Not having cluster drift, also referred to as the "no drift" assumption, yields guarantees on a maximum distance between two elements of the same cluster—this guarantee affords efficient and aggressive screening. The main drawback of such approach is that the clustering is not optimal in the sense that it will yield more clusters, for the same average cluster-to-mark distance, than other clustering algorithm such as k-means. However, a significant advantage of this approach is increased speed. In the case of text compression, having a 10% increase in the number of clusters is not of concern because the size of the dictionary, which convey the information of each clusters is typically a fraction of the size of the compressed document.

After the clustering component has 712 has identified clusters in the mask, the mask is received by an OCR component 714 that performs optical character recognition (OCR) on the mask. The OCR component 714 identifies possible characters in the mask, and can make use of clusters from the clustering component 707 to assist in analyzing the clusters for characters. Each cluster is analyzed to determine if the cluster is a character, and then to determine what character the cluster represents. This approach can vary for different languages and/or alphabets. Generally, the shape or bitmap of the clusters are compared to the shapes or bitmaps of the characters of the alphabet being used. If the shapes are similar enough, the cluster is recognized as that particular character. The position information of each character found can be maintained as well as their sequential order. The characters can be stored as a sequence of characters of a standard alphabet, such as ASCII.

A layout component 716 operates on the mask to improve compression and to provide layout information. The layout information can later be employed to reflow the document image. The layout component 716 can utilize a number of approaches in order to improve compression and/or provide layout information. One approach involves first organizing connected components by color, vertical position and/or horizontal position. The connected components can be provided by another component of the system 700, such as the clustering component 712. The layout component 716 then joins or combines connected components based, at least in part, upon color, vertical position, horizontal position, join distance (e.g., distance between the connected components), height of the connected components and/or width of the connected components. Thus, joined connected components comprise two or more connected components. The joined components can also be joined with other connected components or other joined components. The layout component 716 then generates the layout information to be provided. The layout information can include the position of the joined components, locations of lines and other information of the document image.

The mask encoder 718 receives the mask from the layout analysis component 716 and encodes the mask to generate a compressed bitstream referred to as a mask bitstream. Any suitable compression scheme can be employed by the mask encoder 718. The mask is binary and typically includes textual information. Thus, a compression scheme should be select that compresses binary and textual information well. A bi-level compression scheme can be employed to encode the mask. Additionally, the mask encoder 718 encodes or supplies encoding information to be employed to decode the mask bitstream, such as, for example libraries, dictionaries, symbols, tables sizes and the like.

A compression scheme that can be employed to encode the mask is CCITT (Consultative Committee on International Telephone and Telegraph). The CCITT is currently known as ITU-T International Telecommunications Union-Telecommunications Sector (changed name in 1994)) which is a standards group and a name of a lossless compression technology for fax/modem communication. This type of compression works well with binary images. Typical compression ratios are 4:1 for the older version V.42bis, and 6:1 for newer version V.44 2000, which is based on the Lempel-Ziv-Jeff-Health (LZJH) compression algorithm. Other compression methods or schemes can be employed to encode the mask and still be in accordance with the present invention.

A foreground background segmenter 719 receives the document image and the mask and separates the document image into a foreground image and a background image. According to this aspect of the invention, the foreground image and the background image are substantially the same size as the document image (e.g., the document image being 640 by 480, the foreground image being 640 by 480 and the background image being 640 by 480 pixels). However, alternate aspects of the invention can generate foreground and background images that differ substantially in size from the document image. The foreground image and background image are such that, when combined or recombined, can be identical or similar to the document image.

The foreground background segmenter 719 uses the mask, which is in binary format, to create the foreground and background image. For example, all pixels represented by a 1 in the mask can go to the foreground image and all pixels represented by a 0 in the mask can go to the background image. Conversely, as an example, all pixels represented by a 0 in the mask can go to the foreground image and all pixels represented by a 1 in the mask can go to the background image. However, the background image and the foreground image typically have pixels with unassigned values. These pixels with unassigned values are referred to as holes, vacant regions and/or don't care regions.

Additionally, the foreground background segmenter 719 includes a dilate component 720 and a retouch component 721. The dilate component 720 operates on the mask to dilate the mask according to the foreground image and/or the background image. The dilate operation is a morphological operation based on the distance transform which takes a mask and extend the regions of '1' by k pixels, where k is a constant (e.g. 2). The distance can be a Manhattan distance or spherical distance. The converse operation, erosion, can be performed by a dilation of the inverse mask. In typical scanned documents, text is often washed out, as a result of ink bleeding, or low dpi setting during the scan. Therefore the transition from white to black is a continuous and gradual one, and the mask defines a hard boundary between foreground and background. The continuous transition near the boundary on both the foreground and the background can introduce ringing and can be costly to encode. To alleviate this effect, it is advantageous to ignore the pixel values near the boundary. This is done by performing a dilation of the "don't care" values for both the foreground and the background, by a distance of several pixels (e.g. 2). Around the regions of text, the dilation of the "don't care" pixels increases both contrast and readability, while reducing file size. When dilation is used in regions of natural images, however, the effect of increased contrast makes the images look cartoonish. To circumvent this problem, it is possible to perform a layout analysis of the mask and detect which regions are made of text. The dilation can then be specific to text regions only. The dilate component 720 can separate the mask into a foreground mask and a background mask. As a result, there are pixels that are don't care for both the foreground and the background. These pixels still get assigned a reasonable values because the dilate distance is small, and the foreground and background are typically smooth due to compression and therefore the don't care pixel get assigned values that are not far off from neighboring do care pixels. However, care must be taken during the dilation of don't care not to completely erase small or thin region of do care pixels. If this happens, the pixels become unconstrained and far away from any do care pixels, resulting in unpredictable coloring from far away regions. To prevent this from happening, one can look at the distance transform and protect local extrema from being switch from do care to don't care.

It is appreciated, that the foreground image and the background image can eventually be recombined into a recombined document. However, the sharp edges and transitions can cause compression to degrade and can cause the recombined image to suffer visual deficiencies, such as edges or lines. This can happen, for example, when the mask causes a spurious boundary across a substantially similar color region, causing a portion of the substantially similar region to be placed in the foreground image and another portion to be placed in the background image. These portions, when ultimately recombined, can have a visually, noticeable line across the spurious boundary because the portions are processed separately and encoded separately. Additionally, the compression of these portions can be degraded because the spurious boundary is, essentially, encoded with each portion.

The retouch component 721 operates on the mask to "re-touch" the document image so that overall compression of the document image can be improved and so that, visually, a recombined document image is improved. Generally, the retouch component 721 identifies spurious boundaries and/or extends the foreground and/or background image by way of the mask. For one approach, the retouch component 721 utilizes the mask to identify spurious boundaries in the foreground and background images. Detection can be performed by identifying horizontal and/or vertical lines of a merged region boundary that are longer than a first threshold quantity of pixels (e.g., five pixels) for which: (1) one side of the boundary is foreground and the other side background and (2) linear regression along that line on either side differs by more than a second threshold amount (e.g., linear regression can be performed on the boundary pixels of the foreground side of the pixels and linear regression performed for the pixels of the background side of the pixels). The retouch component 721 may obtain this region information from the mask separator 704. The retouch component 721 then extends the foreground and/or background image by generating separate foreground and background masks from the mask. The foreground mask extends the foreground image while the background mask extends the background mask. Generally, the foreground image and the background image are extended a number of pixels across spurious boundaries. It is appreciated that the foreground and background masks are not typically encoded or employed as part of a decoding process. Other approaches can be employed for the retouch component 721 to improve compression and visual appearance of the document image, when recombined, and still be in accordance with the present invention.

As stated above, the foreground background segmenter 719 uses the mask to segment the document image into the foreground and background images. If foreground and background masks are generated by the dilate component 720 and/or the retouch component, the foreground mask is employed to segment the document image into the foreground image and the background mask is employed to segment the document image into the background image.

A foreground pixel filler 722 receives the foreground image from the foreground background separator segmenter 719. Generally, the foreground pixel filler 722 identifies don't care regions or vacant regions in the foreground image and fills these regions with don't care pixels. These regions are formed from pixels of the document image that are allocated to the background image leaving vacant or don't care regions in the foreground image. The don't care pixels are not typically present in a recombined document image so the foreground pixel filler 722 does not consider the visual appearance of the don't care pixels. Alternate aspects of the invention can avoid filling don't care pixels by using a compression scheme that properly handles the don't care regions, such as a masked wavelet compression scheme.

As stated above, the foreground image and the background image have vacant or don't care regions. The vacant regions can be handled a number of ways. One approach is to fill the vacant regions with data and then use a regular compression technique. A simple process to fill the vacant regions of the images is to fill those vacant regions with an average pixel value for that image. However, this process can create sharp discontinuities at the mask boundaries, can increase a required bit rate for a given peak signal-to-noise ratio (PSNR) and produce noticeable ringing near the mask or vacant region boundaries. Another process is to color each pixel with the color of the closest non-masked (or do care region) pixel. A standard morphology algorithm allows that process to be performed with only two passes over all the pixels leading to Voronoi-filled vacant regions under the mask. Then, when the foreground or background image is reconstructed, the reconstructed image is low-passed and then the known pixels are restored to their correct values. If the low-pass filter cutoff frequency is too low, sharp edges can occur causing an increase in the required bit rate and noticeable ringing near boundaries.

Another approach to handling vacant regions is to use projection onto convex sets. For example, consider two convex sets: the set of images that matches the input on the visible pixels, and the set of images that have certain wavelet coefficients set to zero (e.g. all high-frequency coefficients beyond a certain resolution level). By alternating projection onto those two sets, an image can be found that agrees with the visible pixels and which compresses well because it has many zero wavelet coefficients.

Yet another approach to handling vacant regions is to use wavelet transforms designed explicitly for irregular grids. Such wavelet decompositions are needed in problems in computer vision and compression of geometry data in computer graphics. Such wavelets are adapted to the irregular pattern of the mask.

Another approach is to use a masked wavelet compression scheme for encoding that can compress the foreground image well without filling the don't care regions with don't care pixels. The masked wavelet compression scheme, as described with respect to FIG. 1, is one such compression scheme that can be employed. Other suitable approaches to handling don't care regions can be used in accordance with the present invention.

A foreground downsample component 724 receives the foreground image from the foreground pixel filler 722 and downsamples the foreground image. The foreground downsample component 724 reduces the size of the foreground image to increase compression of the foreground image and the document image. For example, a foreground image of 640 by 480 pixels can be downsampled to 320 by 240. A number of approaches can be employed to downsample the foreground image. One approach is to discard pixels to downsample the foreground image. Thus, for example, a foreground image can be downsampled from 640 by 480 to 320 by 240 pixels by discarding every other pixel. Another approach is to generate new pixels based on an average or mean of corresponding pixels from the foreground image. For example, the new pixels of the foreground image can be respectively generated as an average of eight neighboring pixels. Yet another approach is to downsample using cubic interpolation. Still other approaches to downsample the image can be employed in accordance with the present invention. If the foreground and background are downsampled in the encoder, they should generally be upsampled in the decoder before being combined using the mask.

A foreground encoder 726 encodes the foreground image. The foreground encoder 726 generates an encoded bitstream from the foreground image. This bitstream can be referred to as the foreground bitstream. The foreground encoder 726 can utilize a number of suitable compression schemes to encode the foreground image. Some exemplary compression schemes that can be employed are, for example, progressive wavelet encoding or progressive transform encoding.

The foreground encoder 726 can also include a constant color connected component analyzer (not shown) to further improve compression of the foreground image. The constant color connected component can use approaches and algorithms similar to those described with respect to the clustering component 712. The constant color connected component analyzer scans the foreground image to identify constant color connected pixels. If a group of constant color connected pixels is greater than a threshold value, that group is considered a constant color connected component or constant color mark. It is appreciated that "constant color" can include some variations in color. The constant color connected component analyzer can further group similar constant color connected components into constant color clusters. Related information, such as positional information for the constant color clusters, bitmaps, shapes, position information for the constant color connected components and the like can be included with the foreground bitstream. Constant color can also be restricted to text via a layout analyzer employed to detect which regions are composed of text.

A background pixel filler 730 receives the background image from the background background separator 719. The background pixel filler 730 identifies don't care regions in the background image and fills these regions with don't care pixels. These regions are formed from pixels of the document image that are allocated to the foreground image leaving vacant or don't care regions in the background image. The don't care pixels are not typically present in a recombined document image so the background pixel filler 730 does not consider the visual appearance of the don't care pixels. Alternate aspects of the invention can avoid filling don't care pixels by using a compression scheme that properly handles the don't care regions, such as a masked wavelet compression scheme. The background pixel filler 730 operates substantially the same as the foreground pixel filler 722.

As stated above, the background image and the foreground image have vacant or don't care regions. The vacant regions can be handled a number of ways. One approach is to fill the vacant regions with data and then use a regular compression technique. A simple process to fill the vacant regions of the images is to fill those vacant regions with an average pixel value for that image. However, this process can create sharp discontinuities at the mask boundaries, can increase a required bit rate for a given peak signal-to-noise ratio (PSNR) and produce noticeable ringing near the mask or vacant region boundaries. Another process is to color each pixel with the color of the closest non-masked (or do care region) pixel. A standard morphology algorithm allows that process to be performed with only two passes over all the pixels leading to Voronoi-filled vacant regions under the mask. Then, when the foreground or background image is reconstructed, the reconstructed image is low-passed and then the known pixels are restored to their correct values. If the low-pass filter cutoff frequency is too low, sharp edges can occur causing an increase in the required bit rate and noticeable ringing near boundaries.

Another approach to handling vacant regions is to use projection onto convex sets. For example, consider two convex sets: the set of images that matches the input on the visible pixels, and the set of images that have certain wavelet coefficients set to zero (e.g. all high-frequency coefficients beyond a certain resolution level). By alternating projection onto those two sets, an image can be found that agrees with the visible pixels and which compresses well because it has many zero wavelet coefficients.

Yet another approach to handling vacant regions is to use wavelet transforms designed explicitly for irregular grids. Such wavelet decompositions are needed in problems in computer vision and compression of geometry data in computer graphics. Such wavelets are adapted to the irregular pattern of the mask.

Another approach is to use a masked wavelet compression scheme for encoding that can compress the background image well without filling the don't care regions with don't care pixels. The masked wavelet compression scheme, as described with respect to FIG. 1, is one such compression scheme that can be employed. Other suitable approaches to handling don't care regions can be employed in accordance with the present invention.

A background downsample component 732 receives the background image from the background pixel filler 730 and downsamples the background image. The background downsample component 732 reduces the size of the background image to increase compression of the background image and the document image. For example, a background image of 640 by 480 pixels can be downsampled to 320 by 240. A number of approaches can be employed to downsample the background image. One approach is to discard pixels to downsample the background image. Thus, for example, a background image can be downsampled from 640 by 480 to 320 by 240 pixels by discarding every other pixel. Another approach is to generate new pixels based on an average or mean of corresponding pixels from the background image. For example, the new pixels of the background image can be respectively generated as an average of eight neighboring pixels. Still other approaches to downsample the image can be employed in accordance with the present invention. Generally, the size of the foreground image and the background images are substantially the same after being downsized by the foreground downsample component 724 and the background downsample component 732, respectively.

A background encoder 734 encodes the background image. The background encoder 734 generates an encoded bitstream from the background image. This bitstream can be referred to as the background bitstream. The background encoder 734 can utilize a number of suitable compression schemes to encode the background image. Some exemplary compression schemes that can be employed are, for example, progressive wavelet encoding or progressive transform encoding.

The background encoder 734 can also include a constant color connected component analyzer (not shown) to further improve compression of the background image. The constant color connected component can use approaches and algorithms similar to those described with respect to the clustering component 712. The constant color connected component analyzer scans the background image to identify constant color connected pixels. If a group of constant color connected pixels is greater than a threshold value, that group is considered a constant color connected component or constant color mark. It is appreciated that "constant color" can include some variations in color. The constant color connected component analyzer can further group similar constant color connected components into constant color clusters. Related information, such as positional information for the constant color clusters, bitmaps, shapes, position information for the constant color connected components and the like can be included with the background bitstream. Constant color can also be restricted to text, where a layout analyzer is used to detect which regions are composed of text.

Any suitable number of compression schemes can be employed with the mask encoder 718, the foreground encoder 726 and the background encoder 734. Some of these schemes have been described above. Additional details of those compression schemes and additional compression schemes that can be employed with the mask encoder 718, the foreground encoder 726 and the background encoder 734 are described here.

Some commonly known compression schemes that can be employed with the present invention are JPEG (joint photographic experts group, PWT (progressive wavelet transform), JPEG 2000, PTC (progressive transform codec), GIF (graphic interchange format), PNG (portable network graphics) can be employed. JPEG is, in general, a lossy compression based on Discrete Cosine Transformation (DCT), although it does have settings for lossless compression, which achieves a typical compression ratio of 2:1. This compression technology is generally used for photographic images. JPEG can store 24-bit per-pixel color (16 million colors) at an average compression ratio of 20:1 for full color compression. Generally, however, average compression ratio varies from 10:1 to 20:1 without visible loss, 60:1–100:1 for moderate quality, and 60:1 to 100:1 for poor quality. A few drawbacks of this technology are its difficulty with sharp edges, and its lack of support for transparency. Additionally, it has takes longer to view than GIF format, but it is superior to GIF with regard to images like full color or gray-scale scanned photos.

PWT is part of lossless technology and is the basis for many other compression technologies. PWT is based on the idea that it is best to see the entire image first and continue to increase the resolution iteratively over time. This allows for efficient transfer of high fidelity images. Specifically, by transferring the low frequency components first, a low-resolution version of the entire image is transferred. Then the resolution is increased as the higher frequency components arrive.

JPEG 2000 was designed to replace JPEG standard based on DCT with wavelet based compression technology. JPEG 2000 eliminates blocking artifacts present in JPEG, while maintaining 24-bit color. Additionally, JPEG 2000 supports both lossy and lossless compression with compression ratios of 201:1 for lossy and 2:1 for lossless.

PTC is a compression scheme that combines the some of the features of formats such as JPEG, GIF, PNG, M-JPEG, JPEG-LS, and others, but with better compression performance and in many cases significantly faster encoding and decoding. PTC can provide a reduced amount of artifacting compared to JPEG.

PTC also adds new features. One important added feature is scalability (or progressive rendering). From an original PTC file, a lower-resolution or lower-fidelity picture can be obtained by parsing and decoding a portion of the file. PTC also supports up to 16 bits per color and four color channels or components (R, G, B, and alpha), where alpha is a transparency component. PTC also integrates lossless and lossy encoding in a single codec. Additionally, efficient reference code for PTC is available. The code has low memory footprint and uses only integer arithmetic (no floating-point), for exact reproducibility.

In order to implement PTC, a multi-resolution transform is employed to achieve progressive rendering. One approach is to use wavelets, but a more efficient one, with a lower computation cost, is to use hierarchical lapped transforms. In PTC a new hierarchical lapped biorthogonal transform (LBT), which improves on prior PTC construction in by using a smaller 4×4 block size, and integer coefficients—allowing for its computation without substantially any multiplications (the transform in prior PTC schemes still employed floating-point arithmetic). The main advantage of lapped transforms over the popular discrete cosine transform (DCT, used in JPEG and MPEG) is that lapped transforms are free from the "blocking artifacts" of the DCT. Also, due to the multiresolution (hierarchical) form of the LBT used in PTC, ringing artifacts are less noticeable than in DCT-based codecs.

GIF is a lossless 8-bits-per-pixel color (256 colors) compression format with an average compression of about 3:1. GIF has Lempel-Ziv-Welch (LZW) coding built in, which is why it does not provide great compression for photos but it does for simpler line drawings. GIF compression can work with all kinds of images, but it works best with computer-generated graphics with only a few colors, which makes it is popular for Web based graphics. Moreover, diagrammatical images with sharp edges are compressed better than JPEG.

PNG is a lossless format that offers compression on average 10–30% smaller than GIF. It is also better than JPEG for true color images, because it has 48-bit color, which is better than JPEG's 24-bit color. Additionally, PNG allows for transparency, and its compression is asymmetric, meaning its decompression is fast while compression takes much longer. PNG is designed for use on the Internet so its fast decompression is plus. Additionally, PNG was designed to replace the GIF format, which uses LZW coding. PNG uses the freeware Gzip compression scheme instead of LZW coding.

Figure 8:
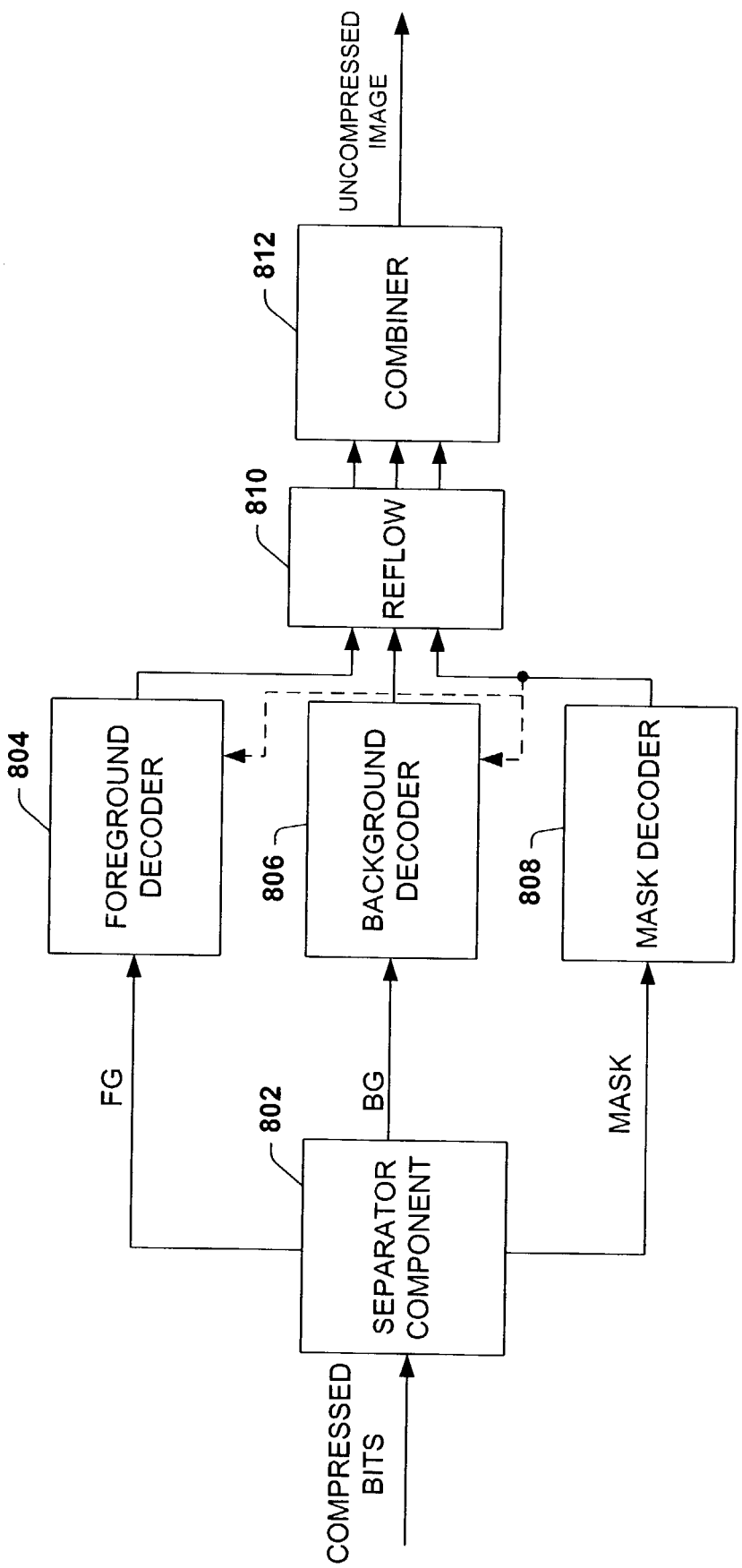
FIG. 8 is a block diagram of a segmented layered image decoding system according to one aspect of the invention.

FIG. 8 is a block diagram of a segmented layered image decoding system according to one aspect of the invention. The system receives compressed bits, bitstream or file and generates a recombined image. The system includes a separator component 802, a foreground decoder 804, a background decoder 806, a mask decoder 808, a re-flow component 810 and a combiner 812.

The separator component 802 receives the compressed bits and separates the bits to form a foreground bitstream, background bitstream and mask bitstream. The separator component 802 can utilize header information to separate the bitstreams. The foreground decoder 804 decompresses the foreground bitstream to yield a foreground image. The background decoder 806 decompresses the background bitstream to yield a background image.

The mask decoder 808 decompresses the mask bitstream to yield a mask or mask image. The mask decoder 808 can also retrieve layout and/or re-flow information. Additionally, the mask decoder 808 can obtain a dictionary employed for reconstructing textual information. For some compression schemes (e.g., masked wavelet), the foreground decoder 804 and the background decoder 806 can require the decompressed mask from the mask decoder 808 in order to obtain the foreground image and the background image.

The re-flow component 810 operates on the foreground image, the background image and the mask according to desired display properties. The desired display properties can include properties such as display page size, number of columns, font size and the like. The desired display properties can be quite different than the properties of the original document image. For example, a document image can have a letter page size and a 10 point font size. Those properties of the document image are fine for viewing on standard letter paper. However, those properties would likely make viewing on a portable device such as a portable digital assistant (PDA) difficult at best. The PDA, generally has a narrow screen and lower resolution. Without re-flowing, a user using the PDA would have to pan across to read each line of text. Thus, for the PDA, the desired display properties may be a column size of twenty, font size of 14 and the like. The re-flow component 810 can wrap text as necessary, reposition paragraphs, reposition sentences, reposition images, resize images and/or perform any other suitable modifications according to the desired display properties. The re-flow component 810 utilizes layout information encoded with the foreground image, background image and/or mask.

The combiner 812 combines the foreground image, the background image and the mask into a recombined document image. The recombined image is identical to or an approximation to an original document image. Additionally, the recombined image can have a different shape and/or size depending on the desired display properties. The combiner 812 generates pixels for the recombined document image from the foreground and background images based on the mask. Each pixel of the recombined document image is determined by referencing a corresponding pixel of the mask thereby determining whether the pixel of the recombined document should come from the foreground image or the background image. For example, a mask pixel value of 1 can indicate that the pixel of the recombined document should come from the corresponding pixel of the foreground image. Additionally, the combiner 812 performs any suitable color space conversion necessary. For example, the recombined image may be represented using the YCoCg colorspace. Thus, continuing the example, the combiner 812 would convert from the YCoCg colorspace to the RGB colorspace (e.g. in order to display on a monitor).

Figure 9:
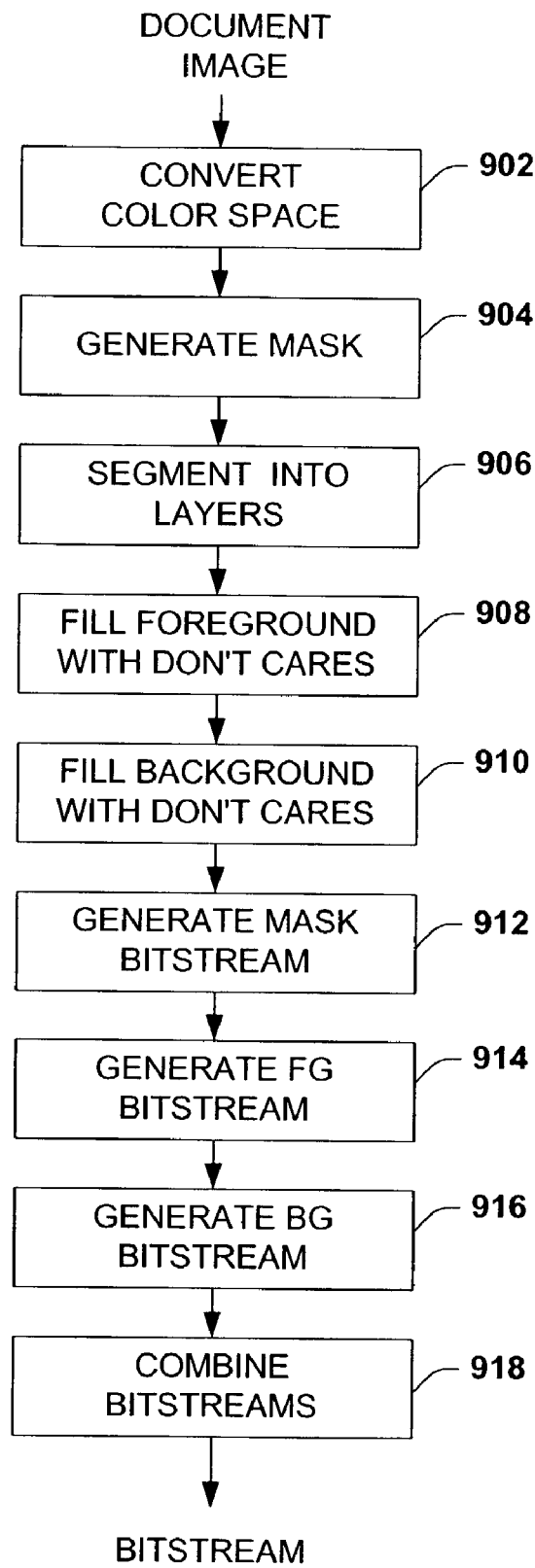
FIG. 9 is a flow diagram of a method of encoding a document according to one aspect of the invention.

FIG. 9 is a flow diagram of a method of encoding a document image according to one aspect of the invention. A document image is provided at 902. The document image is a bitmap image and has a colorspace representation, which typically is RGB. The document image can be converted from its colorspace to another colorspace, such as YUV or YCoCg, to increase compression.

A mask is generated for the document image at 904. The mask is a binary image based on the document image. The mask is generated such that the document image can be segmented or separated into a foreground image and a background image such that the foreground image and the background image are highly compressible. Each pixel of the mask determines whether a corresponding pixel of the document image is placed in the foreground image or the background image. The mask can be generated in any suitable manner such that a combined size of the mask, the foreground image and the background image is reduced after compression.

It is appreciated that additional processing of the mask, including but not limited to, noise detection, noise correction, dither detection and handling and the like can be performed on the mask. For example, noise is often introduced into a document image during a digitization process. Fingerprints and/or dirt, for example, can be included unintentionally in the document image. The noise can be identified and removed from the mask. Dithering is a technique employed to create the illusion of varying shades of gray or colors. Dithering varies a ratio or percentage of dots in a region to simulate the shade. Dithering may make an image appear nicely, but can cause problems for digital documents. The dithering can get misinterpreted as text, handwriting and the like. The dithering in the mask can be identified and appropriately handled.

Additionally, clusters can be identified in the mask. Connected components are identified in the mask. Connected components are groups of one or more connected dots, typically black dots. Similar connected components are grouped into clusters. Each cluster can be represented with a bitmap and pointers to locations in the mask. The use of clusters can save a tremendous amount of space. Clusters can represent characters, handwriting and the like.

Also, optical character recognition can be performed on the mask. The clusters, whether representing handwriting or text, can be analyzed to identify text or characters. Once recognized, the characters can be stored as, for example, ASCII code and save even more storage space. Furthermore, optical character recognition enhances re-flow and ease of editing of the document image when the document image is ultimately recombined.

The mask can also be analyzed to identify layout properties of the document image. Characters, clusters and images positions can be analyzed to identify the layout properties. Layout properties including but not limited to, sentences, paragraphs, forms, image positions, pagination and the like can be identified. The layout properties can be attached or encoded with the mask for later use.

The document image is segmented into a foreground image and a background at 906, according to the mask. For example, all pixels represented by a 1 in the mask can go to the foreground image and all pixels represented by a 0 can go to the background image. It is appreciated that other aspects of the invention can segment the document image into another suitable number of layers and that the invention is not limited to the two layers described with respect to FIG. 9.

The foreground image and the background image are the same size as the document image. However, the foreground image and the background image have pixels that have not been assigned a value. Those pixels are referred to as holes, voids and/or vacant regions. The holes occur where the values corresponding to those pixels were assigned to the other image. Retouching can be performed on the background and foreground images to reduce hard edges in the ultimately recombined image. Retouching involves extending the foreground image and the background image by a number of pixels so that sharp edges and/or transitions are avoided. Typically, the retouching is performed by generating a foreground mask and a background mask from the mask and segmenting the foreground image from the document image using the foreground mask and segmenting the background image from the document image using the background mask. The foreground mask facilitates extending of the foreground image and the background mask facilitates extending of the background image.

Holes or voids in the foreground image are filled with don't care pixels at 908. The don't care pixels are selected so as to increase compression of the foreground image and reduce the size of the foreground image, after compression. The don't care pixels can be determined using a number of suitable approaches. One approach that can be employed is to fill don't care regions with an average pixel value for the document image. However, this process can create sharp discontinuities at the mask boundaries, can increase a required bit rate for a given peak signal-to-noise ratio (PSNR) and produce noticeable ringing near the mask or vacant region boundaries. Another approach is to color each pixel in the don't care regions with the color of the closest non-masked (or do care region) pixel. A standard morphology algorithm allows that process to be performed with only two passes over all the pixels leading to Voronoi-filled vacant regions under the mask. Then, when the foreground or background image is reconstructed, the reconstructed image is low-passed and then the known pixels are restored to their correct values. If the low-pass filter cutoff frequency is too low, sharp edges can occur causing an increase in the required bit rate and noticeable ringing near boundaries. Another approach to handling vacant regions is to use projection onto convex sets. For example, consider two convex sets: the set of images that matches the input on the visible pixels, and the set of images that have certain wavelet coefficients set to zero (e.g. all high-frequency coefficients beyond a certain resolution level). By alternating projection onto those two sets, an image can be found that agrees with the visible pixels and which compresses well because it has many zero wavelet coefficients. Other suitable approaches of filling the don't care regions can be employed in accordance with the present invention.

Holes or voids in the background image are filled with don't care pixels at 910. The don't care pixels are selected so as to increase compression of the background image and reduce the size of the background image, after compression. The don't care pixels can be determined using a suitable approach as described above with respect to the foreground image.

It is appreciated that alternate aspects of the invention can leave vacant regions unfilled. Thus, a compression scheme, such as the masked wavelet compression scheme, can be employed to encode the foreground and background images without filling the vacant or don't care regions.

The mask is encoded to generate a mask bitstream at 912. The mask is encoded using a suitable compression scheme. The compression scheme can utilize the textual information and binary representation of the mask in order to improve compression of the mask. Additionally, clusters, layout information and the like can also be employed to better compress the mask.

It is appreciated that additional processing can be performed on the background and foreground images. For example, noise removal and downsampling can be performed on the background and foreground images. Noise removal removes or handles noise present in the foreground and background images. Typically, this noise is introduced in a scanning or conversion process. Downsampling reduces the size of the foreground and background images. For example, 640 by 480 pixel foreground and background images can be downsampled to 320 by 240 sized images.

The foreground image is encoded to generate a foreground bitstream at 914. The foreground image is encoded using a suitable compression scheme. Some exemplary compression schemes that can be employed to encode the foreground image are PWC, PTC, JPEG, JPEG 200, PNG and GIF. Other compression schemes can be employed and still be in accordance with the present invention.

The background image is encoded to generate a background bitstream at 916. The background image is encoded using a suitable compression scheme. Some exemplary compression schemes that can be employed to encode the foreground image are PWC, PTC, JPEG, JPEG 200, PNG and GIF. Other compression schemes can be employed and still be in accordance with the present invention.

The background and foreground images can also be analyzed to identify constant color connected components in order to further improve compression of the foreground and background images. Constant color connected components comprise a plurality of connected pixels having substantially the same color value. The constant color connected components can be identified by locating a seed pixel of a color and using an algorithm to find all, or substantially all of the connected pixels having that same color or substantially same color.

The mask bitstream, the foreground bitstream and the background bitstream are combined at 918 to form a combined bitstream. The combined bitstream can also be a file. Header information can be added to the combined bitstream to include information such as encoder used, dictionaries, symbols, libraries and the like.

Figure 10:
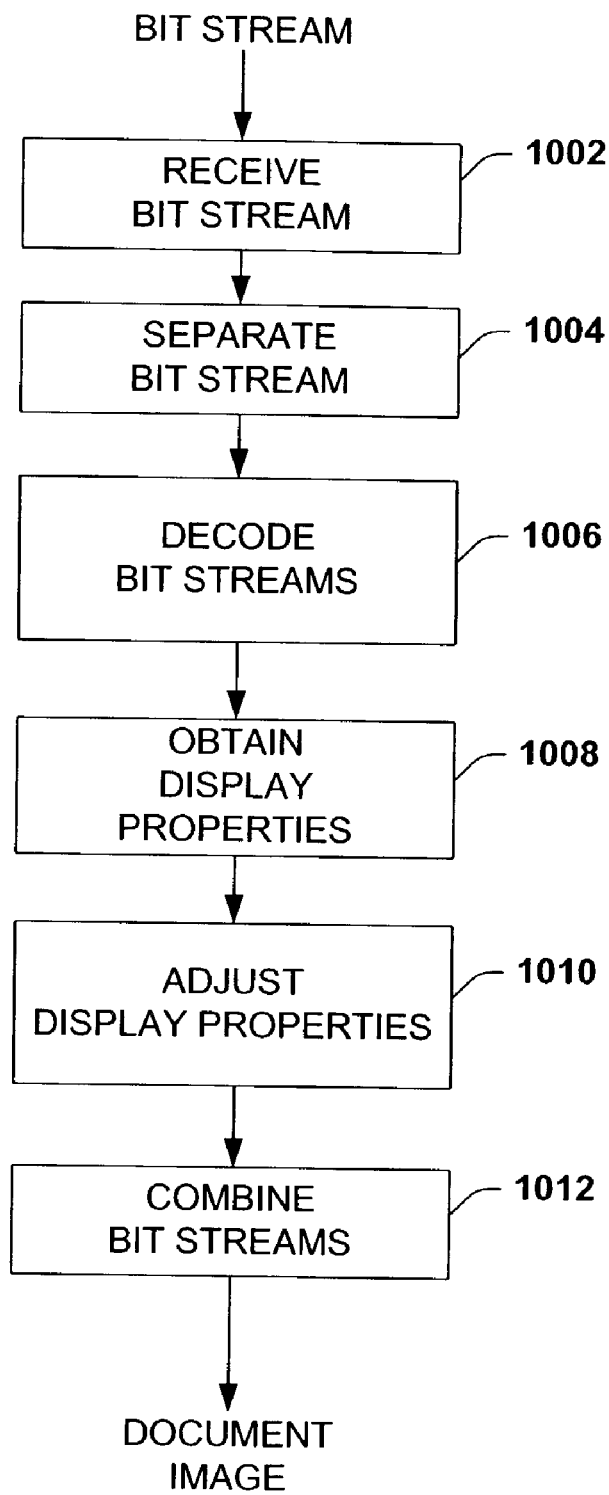
FIG. 10 is a flow diagram of a method of encoding a document according to one aspect of the invention.

FIG. 10 is a flow diagram of a method of decoding a document image according to one aspect of the invention. A bitstream is received at 1002. The bitstream is a combined bitstream including a mask bitstream, a foreground bitstream, a background bitstream and header information. The bitstream is separated into the mask bitstream, the foreground bitstream and the background bitstream at 1004. Additional, the header information can be extracted.

A mask, a foreground image and a background image are decoded from the mask bitstream, the foreground bitstream and the background bitstream, respectively at 1006. The mask, the foreground image and the background image are collectively referred to as the image components. The mask, the foreground image and the background image are decoded using a decompression scheme compatible with the compression scheme of which they were encoded with. The header information can include this compression/decompression information. The mask and/or header information can include layout information or layout properties. Additionally, dictionaries, symbols and other information can be decoded from the mask or obtained from the header information.

Display properties are provided at 1008. The display properties can be predetermined, input by a user and/or dynamically determined. The display properties include information such as display size, font size, columns and the like. The mask, the foreground image and the background image are modified according to the display properties at 1010. The image components are modified so that when recombined, they match the display properties. For example, text in the mask can be re-flowed to properly display on a narrow screen without panning across.

The mask, the foreground image and the background image are combined at 1012 to form a recombined document image. The foreground image and the background image are combined according to the mask to form the recombined document image. The mask is binary, thus each pixel of the recombined document image is assigned a value from a corresponding pixel of the foreground image or the background image depending on a corresponding pixel of the mask. The recombined document image is identical to or a close approximation of an original document image. The original document image is the document image originally encoded into the received bitstream.

It is to be appreciated that the systems and/or methods of the present invention can be utilized in an overall system facilitating identification and/or compression of text, handwriting, drawings and the like. Further, those skilled in the art will recognize that the system and/or method of the present invention can be employed in a vast array of document image applications, including, but not limited to, photocopiers, document scanners, optical character recognition systems, PDAs, fax machines, digital cameras and/or digital video cameras.

Figure 11:
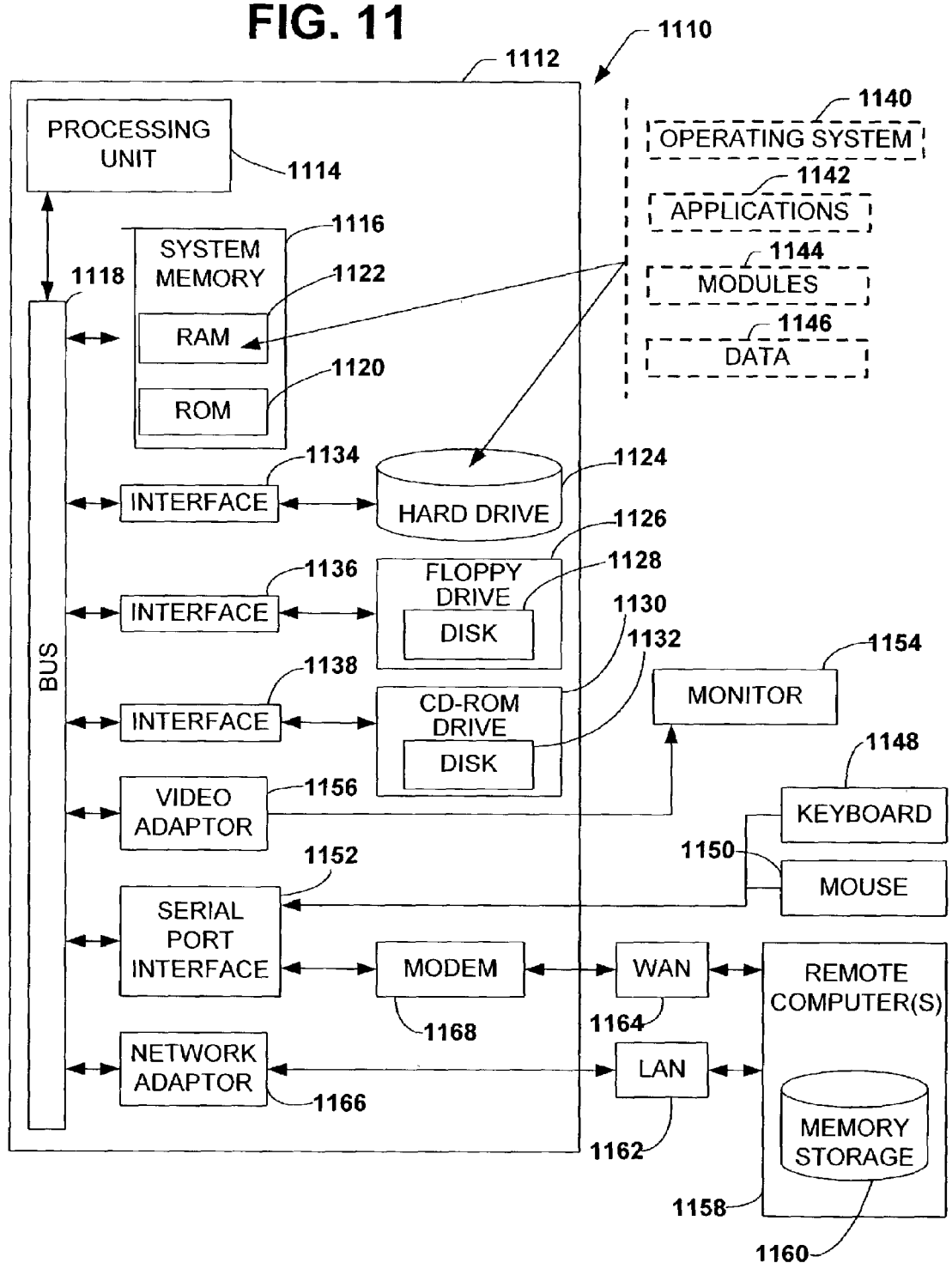
FIG. 11 is a schematic block diagram of an exemplary operating environment for a system configured in accordance with the present invention.

In order to provide additional context for various aspects of the present invention, FIG. 11 and the following discussion are intended to provide a brief, general description of one possible suitable computing environment 1110 in which the various aspects of the present invention may be implemented. It is to be appreciated that the computing environment 1110 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 11 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 11, an exemplary environment 1110 for implementing various aspects of the invention includes a computer 1112, including a processing unit 1114, a system memory 1116, and a system bus 1118 that couples various system components including the system memory to the processing unit 1114. The processing unit 1114 may be any of various commercially available processors. Dual microprocessors and other multi-processor architectures also can be used as the processing unit 1114.

The system bus 1118 may be any of several types of bus structure including a memory bus or memory controller, a peripheral bus, and a local bus using any of a variety of commercially available bus architectures. The computer memory 1116 includes read only memory (ROM) 1120 and random access memory (RAM) 1122 A basic input/output system (BIOS), containing the basic routines that help to transfer information between elements within the computer 1112, such as during start-up, is stored in ROM 1120.

The computer 1112 may further include a hard disk drive 1124, a magnetic disk drive 1126, e.g., to read from or write to a removable disk 1128, and an optical disk drive 830, e.g., for reading a CD-ROM disk 1132 or to read from or write to other optical media. The hard disk drive 1124, magnetic disk drive 1126, and optical disk drive 1130 are connected to the system bus 1118 by a hard disk drive interface 1134, a magnetic disk drive interface 1136, and an optical drive interface 1138, respectively. The computer 1112 typically includes at least some form of computer readable media. Computer readable media can be any available media that can be accessed by the computer 1112. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1112. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1122, including an operating system 1140, one or more application programs 1142, other program modules 1144, and program non-interrupt data 1146. The operating system 1140 in the computer 1112 can be any of a number of commercially available operating systems.

A user may enter commands and information into the computer 1112 through a keyboard 1148 and a pointing device, such as a mouse 1150. Other input devices (not shown) may include a microphone, an IR remote control, a joystick, a game pad, a satellite dish, a scanner, or the like. These and other input devices are often connected to the processing unit 1114 through a serial port interface 1152 that is coupled to the system bus 1118, but may be connected by other interfaces, such as a parallel port, a game port, a universal serial bus ("USB"), an IR interface, etc. A monitor 1154, or other type of display device, is also connected to the system bus 1118 via an interface, such as a video adapter 1156. In addition to the monitor, a computer typically includes other peripheral output devices (not shown), such as speakers, printers etc.

The computer 1112 may operate in a networked environment using logical and/or physical connections to one or more remote computers, such as a remote computer(s) 1158. The remote computer(s) 1158 may be a workstation, a server computer, a router, a personal computer, microprocessor based entertainment appliance, a peer device or other common network node, and typically includes many or all of the elements described relative to the computer 1112, although, for purposes of brevity, only a memory storage device 1160 is illustrated. The logical connections depicted include a local area network (LAN) 1162 and a wide area network (WAN) 1164. Such networking environments are commonplace in offices, enterprise-wide computer networks, intranets and the Internet.

When used in a LAN networking environment, the computer 1112 is connected to the local network 1162 through a network interface or adapter 1166. When used in a WAN networking environment, the computer 1112 typically includes a modem 1168, or is connected to a communications server on the LAN, or has other means for establishing communications over the WAN 1164, such as the Internet. The modem 1168, which may be internal or external, is connected to the system bus 1118 via the serial port interface 1152. In a networked environment, program modules depicted relative to the computer 1112, or portions thereof, may be stored in the remote memory storage device 1160. It will be appreciated that the network connections shown are exemplary and other means of establishing a communications link between the computers may be used.

Figure 12:
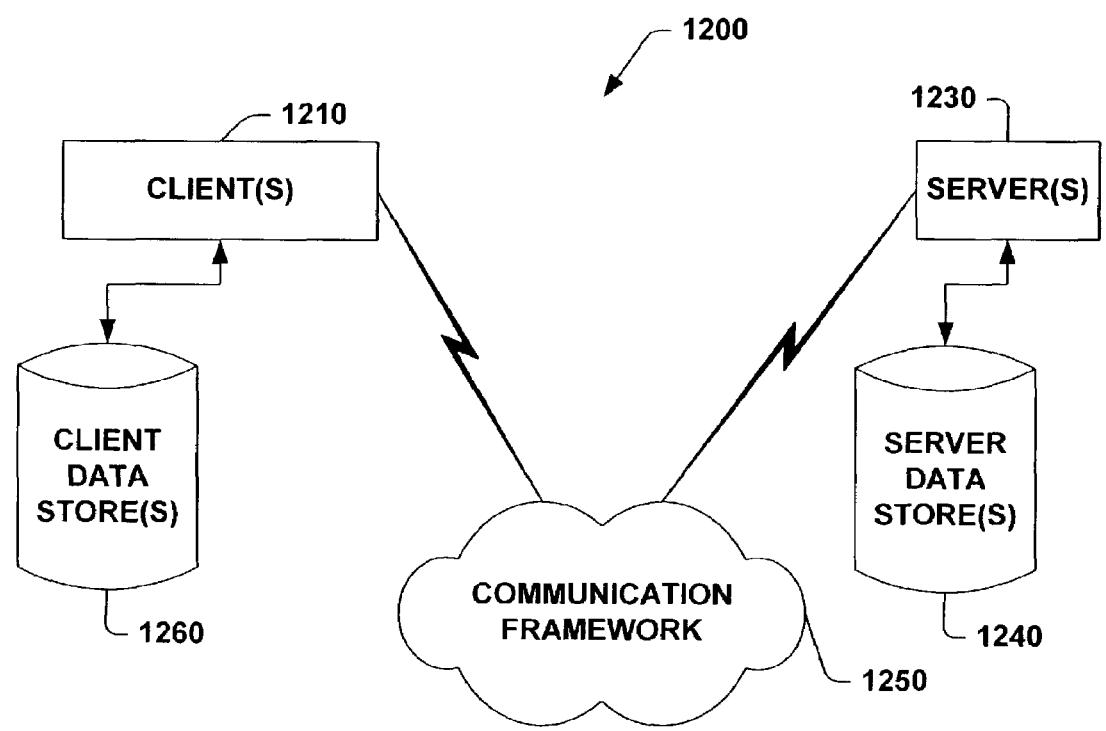
FIG. 12 is a schematic block diagram of an exemplary communication environment in accordance with the present invention.

FIG. 12 is a schematic block diagram of a sample computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A document encoding system comprising:
    a mask separator that receives a document image and generates a mask from the document image, the mask being generated at least in part via merging regions by pairs of the document image based at least in pan upon minimization of pixel energy, the mask generated so as to reduce an estimated compression of a foreground image and a background image, the estimated compression comprising an energy variance computation; and
    an image segmenter that segments the document image into a plurality of layers according to the mask, the plurality of layers represented in non-binary format.

2. The document encoding system of claim 1, the plurality of layers comprising a first image layer and a second image layer and the mask represented in binary format.

3. The document encoding system of claim 2, the first image layer being a foreground image and the second image layer being a background image.

4. The document encoding system of claim 3, ftrther comprising a mask encoder to encode the mask into a mask bitstream.

5. The document encoding system of claim 4, the mask encoder utilizing a fax based compression scheme.

6. The document encoding system of claim 4, the mask encoder utilizing a bi-level compression scheme.

7. The document encoding system of claim 4, further comprising:
    a foreground encoder that encodes the foreground image from the image segmcnter into a foreground bitstream; and
    a background encoder that encodes the background image from the image segmenter into a background bitstrearn.

8. The document encoding system of claim 7, the foreground encoder and the background encoder utilizing a progressive wavelet transform compression scheme.

9. The document encoding system of claim 7, the foreground encoder and the background encoder utilizing a progressive transform compression scheme.

10. The document encoding system of claim 7, the foreground encoder and the background encoder utilizing a masked wavelet compression scheme.

11. The document encoding system of claim 7, further comprising a combiner component to combine the mask bitstream, the foreground bitstream and the background bitstream into a combined bitstream.

12. A document encoding system comprising:
    a mask separator that receives a document image and generates a mask from the document image, the mask generated so as to reduce an estimated compression of a foreground image and a background images, the estimated compression comprising an energy variance computation;
    a retouch component that identifies spurious boundaries and/or extends the foreground and/or background image by way of the mask; and
    an image segmenter that segments the document image into a plurality of layers according to the mask, the plurality of layers represented in non-binary format.

13. The document encoding system of claim 12, the retouch component being operative to generate a foreground mask and a background mask based on the identified spurious boundaries and the image segmenter utilizing the foreground mask to obtain a foreground image and the background mask to obtain a background image.

14. The document encoding system of claim 12, further comprising:
    a mask encoder to encode the mask into a mask bitstream;
    a foreground encoder that encodes the foreground image from the image segmenter into a foreground bitstream; and
    a background encoder that encodes the background image from the image segmenter into a background bitstream.

15. A document encoding system comprising:
    a mask separator that receives a document image and generates a mask from the document image, the mask represented in binary format and generated at least in part via merging regions by pairs of the document image based at least in part upon minimization of pixel energy; and
    a foreground background segmenter that segments the document image into a foreground image and a background image according to the mask, the foreground image and the background image represented in a non-binary format, the mask generated so as to reduce an estimated compression of the foreground image and the background image, the estimated compression comprising an energy variance computation.

16. The system of claim 15, the mask generated to reduce a combined size of the mask, the foreground image and the background image.

17. The system of claim 15, the foreground image comprising a plurality of colors and the background image comprising a plurality of colors.

18. The system of claim 15, the document image comprising textual information.

19. The system of claim 15, the document image comprising a single page.

20. The system of claim 15, the document image comprising handwriting.

21. A photocopier employing the system of claim 15.

22. A document scanner employing the system of claim 15.

23. An optical character recognition system employing the system of claim 15.

24. A personal digital assistant employing the system of claim 15.

25. A fax machine employing the system of claim 15.

26. A digital camera employing the system of claim 15.

27. A digital video camera employing the system of claim 15.

28. A segmented layered image system employing the system of claim 15.

29. A video game employing the system of claim 15.

30. A document encoding system comprising:
a colorspace converter that converts a document image having a first colorspace to a converted document image having a second colorspace;
a mask separator that generate a mask from the converted document image, the mask represented in binary format and being generated at least in part via merging regions by pairs of the document image based at least in part upon minimization of pixel energy; and
a foreground background segnienter that segments the convened document image into a foreground image and a background image according to the mask, the foreground image and the background image represented in a non-binary format, the mask generated so as to reduce an estimated compression of the foreground image and the background image, the estimated compression comprising an energy variance computation.

31. The system of claim 30, the first colorspace being RGB and the second colorspace being YUV.

32. The system of claim 30, the first colorspace being RGB and the second colorspace being YCoCg.

33. A document decoding system comprising:
a separator component that separates a bitstream into a foreground bitstream, a background bitstream and a mask bitstream;
a foreground decoder that decodes the foreground bitstream into a foreground image;
a background decoder that decodes the background bitstream into a background image;
a mask decoder that decodes the mask bitstream into a mask, the mask generated so as to reduce an estimated compression of the foreground image and the background image, the estimated compression comprising an energy variance computation; and
a combiner component that generates a document image as a combination of the foreground image and the background image according to the mask.

34. The system of claim 33, the document image having a pluarlity of pixels, each of the plurality of pixels obtained from one of the group comprising the foreground image and the background image.

35. The system of claim 33, the document image being identical to an original document image.

36. The system of claim 33, the document image being substantially similar to an original document image.

37. The system of claim 36, further comprising a segmented layer document encoding system to generate the mask, the foreground image and the background image, to encode the mask into the mask bitstream, to encode the foreground image into the foreground bitstream, to encode the background image into the background image and to combine the mask bitstream, the foreground bitstream and the background bitstream into the bitstream.

38. A document system comprising:
a colorspace converter that converts a colorspace of a document image;
a mask separator that receives the document image from the colorspace converter and generates a mask for the document image at least in part via merging regions by pairs of the document image based at least in part upon minimization of pixel energy;
a mask processor component that receives the mask from the mask separator and to process the mask; and
a segmenter that segments the document image into a foreground image and a background image according to the mask, the mask generated so as to reduce an estimated compression of the foreground image and the background image, the estimated compression comprising an energy variance computation.

39. The system of claim 38, the mask processor component comprising a dither detection component to identify and remove dithering from the mask.

40. The system of claim 38, the mask processor component further comprising a noise removal component to identify and remove noise from the mask.

41. The system of claim 38, further comprising a clustering component that receives the mask from the mask processor component and determines connected components in the mask and groups similar connected components together as clusters utilizing at least one screening property.

42. The system of claim 41, further comprising a layout component that receives the mask from the clustering component and identifies layout information from the mask.

43. The system of claim 42, further comprising a mask encoder that receives the mask from the layout component and encodes the mask into a mask bitstream.

44. The system of daixn 43, the segmenter comprising a retouch component that analyzes the mask and the document image for spurious boundaries and extends a foreground mask and a background mask by a number of pixels across the spurious boundaries, the foreground mask and the background mask based on the mask, the foreground mask utilized by the segmenter to obtain the foreground image and the background mask utilized by the segmenter to obtain the background image.

45. The system of claim 44, further comprising a color connected component that identifies color connected components in the foreground image and the background image.

46. The system of claim 44, further comprising a foreground encoder that receives the foreground image and encodes the foreground image into a foreground bitstream;
a background encoder that receives the background image and encodes the background image into a background bitstream; and
a combiner component tat combines the mask bitstream, the foreground bitstream and the background bitstream into a combined bitstream.

47. The system of claim 46, further comprising an optical character recognition component that receives the mask from the clustering component and identifies characters in the mask.

48. The system of claim 47, further comprising a foreground pixel filler and a background pixel filler, the foreground pixel filler fills don't care regions of the foreground image with don't care pixels and the background pixel filler fills don't care regions of the background image with don't care pixels.

49. A method of encoding a document comprising:
generating a mask for a document image at least in part via merging regions by pairs of the document image based at least in part upon minimization of pixel energy, the mask generated such that an energy variance of a foreground image, a background image and the mask is reduced, the energy variance being an estimate of compression; and segmenting the document image into the foreground image and the background image, the foreground image and the background image being a non-binary format.

50. The method of claim 49, further comprising:
encoding the mask to generate a mask bitstream;
encoding the foreground image to generate a foreground bitstream;
encoding the background image to generate a background bitstream; and
combining the mask bitstream, the foreground bitstream and the background bitstream into a combined bitstream.

51. The method of claim 49, fbrther comprising filling don't care regions of the foreground image and the background image with don't care pixels.

52. The method of claim 49, further comprising identifying layout information from the mask.

53. The method of claim 49, further comprising removing noise from the mask.

54. The method of claim 49, segmenting the document image further comprising extending the foreground image and the background image a number of pixels.

55. A method of decoding a document comprising:
receiving a bitstream;
separating the bitstream into a mask bitstream, a foreground bitstream and a background bitstream;
decoding the foreground bitstream into a foreground image;
decoding the background bitstream into a background image;
decoding the mask bitstream into a mask, the mask generated such that an energy variance of the foreground image, the background image and the mask is reduced, the energy variance being an estimate of compression; and
combining the foreground image and the background image according to the mask into a reconstructed document image.

56. The method of claim 55, further comprising providing display properties.

57. The method of claim 56, the display properties being provided by a user.

58. The method of claim 56, the display properties being dynamically determined.

59. The method of claim 56, the display properties being predetermined.

60. The method of claim 56, further comprising modifying the foreground image, the background image and the mask according to the display properties.

61. The method of claim 55, further comprising converting a colorspace of the reconstructed document image.

62. A computer readable medium having computer usable components for a document encoding system, comprising:
a colorspace converter component tat converts a colorspace of a document image;
a mask separator component that receives the document image from the colorspace converter component and generates a mask for the document image at least in part via merging regions by pairs of the document image based at least in part upon minimization of pixel energy; and
a segmenter component that receives the document image from the colorspace converter and segments the document image into a foreground image and a background image according to the mask, the mask generated such that an energy variance of the foreground image, the background image and the mask is reduced, the energy variance being an estimate of compression.

63. The computer readable medium of claim 62, further comprising:
a mask processor component that receives the mask from the mask separator component and processes the mask;
a clustering component that receives the mask from the mask processor component and identifies clusters in the mask; and
a layout component that receives the mask from the clustering component and identifies layout information from the mask.

64. The computer readable medium of claim 63, further comprising:
a mask encoder component that receives the mask from the layout component and encodes the mask into a mask bitstream;
a foreground encoder component that encodes the foreground image into a foreground bitstream;
a background encoder component that receives the background image and encodes the background image into a background bitstream; and
a combiner component that combines the mask bitstream, the foreground bitstream and the background bitstream into a combined bitstream.

65. An encoding system comprising:
means for generating a mask for a document image at least in part via merging regions by pairs of the document image based at least in part upon minimization of pixel energy;
means for segmenting the document image into a foreground image and a background image;
means for encoding the mask into a mask bitstream, the mask generated such that an energy variance of the foreground image, the background image and the mask is reduced, the energy variance being an estimate of compression;
means for encoding the foreground image into a foreground bitstream;
means for encoding the background image into a background bitstream; and
means for combining the mask bitstream, the foreground bitstream and the background bitstream into a combined bitstream.

\* \* \* \* \*